(12) United States Patent
Darcie et al.

(10) Patent No.: US 6,577,714 B1
(45) Date of Patent: Jun. 10, 2003

(54) MAP-BASED DIRECTORY SYSTEM

(75) Inventors: Thomas Edward Darcie, Middletown, NJ (US); Peter D. Magill, Freehold, NJ (US); Norman Ashton Whitaker, Jr., Atlantic Highlands, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/824,106

(22) Filed: Mar. 25, 1997

Related U.S. Application Data

(63) Continuation-in-part of application No. 08/613,307, filed on Mar. 11, 1996.

(51) Int. Cl.[7] .............................................. H04M 11/00
(52) U.S. Cl. ................................ 379/93.17; 379/93.23; 379/100.01
(58) Field of Search ........................... 379/93.23, 93.17, 379/93.19, 93.25, 93.01, 90.01, 100.01, 100.11, 355; 340/990, 995; 345/326, 329, 348, 339, 810, 835, 839, 846; 701/208, 200

(56) References Cited

U.S. PATENT DOCUMENTS

| | | | |
|---|---|---|---|
| 4,811,244 A | 3/1989 | Shimada et al. ............ 364/521 |
| 4,850,007 A * | 7/1989 | Marino et al. ............. 379/112 |
| 5,109,399 A | 4/1992 | Thompson | |
| 5,124,915 A | 6/1992 | Krenzel ..................... 364/420 |
| 5,193,185 A | 3/1993 | Lanter ........................ 395/600 |
| 5,315,636 A | 5/1994 | Patel | |
| 5,325,423 A | 6/1994 | Lewis .......................... 379/90 |
| 5,392,223 A | 2/1995 | Caci ............................ 364/514 |
| 5,393,964 A | 2/1995 | Hamilton et al. | |
| 5,414,462 A | 5/1995 | Veatch ........................ 348/135 |
| 5,426,780 A | 6/1995 | Gerull et al. ................ 395/600 |
| 5,428,608 A * | 6/1995 | Freeman et al. .......... 379/93.08 |
| 5,452,353 A | 9/1995 | Menezes ...................... 379/355 |
| 5,463,671 A | 10/1995 | Marsh et al. .................. 379/56 |
| 5,470,233 A | 11/1995 | Fruchterman et al. | |
| 5,475,802 A | 12/1995 | Wescott et al. ............. 395/129 |

(List continued on next page.)

FOREIGN PATENT DOCUMENTS

EP 0574138 A1 * 12/1993 ............ H04N/7/15

OTHER PUBLICATIONS

N.S., "My Yahoo! News Ticker", PC Magazine, Feb. 18, 1997, v16, n4, p. 143.

D.L., "NETdelivery", PC Magazine, Feb. 18, 1997, v16, n4, p. 143.

(List continued on next page.)

*Primary Examiner*—Stella Woo
(74) *Attorney, Agent, or Firm*—Morgan & Finnegan L.L.P.

(57) ABSTRACT

A method and system are disclosed for a map-based directory service. Users are presented with a map on a computer screen, the map having symbols indicating real-world locations such as buildings, streets, parks, and bodies of water. A close correspondence exists between the map and the real-world. The map further has symbols indicating virtual locations. A virtual location, as the name implies, refers to a location that appears on the map but is not physically present in the real world. In accordance with the present invention, users can locate listings in conjunction with both real and virtual locations related to such listings, and, can connect to the entities associated with those listings once located.

41 Claims, 19 Drawing Sheets

U.S. PATENT DOCUMENTS

| | | | |
|---|---|---|---|
| 5,481,590 A | | 1/1996 | Grimes |
| 5,515,424 A | | 5/1996 | Kenney |
| 5,537,324 A | * | 7/1996 | Nimura et al. ............... 340/990 |
| 5,543,789 A | | 8/1996 | Behr et al. |
| 5,559,707 A | * | 9/1996 | DeLorme et al. ........... 455/456 |
| 5,602,903 A | | 2/1997 | Leblanc et al. |
| 5,671,342 A | * | 9/1997 | Millier et al. ............... 395/118 |
| 5,682,525 A | * | 10/1997 | Bouve et al. ............... 395/615 |
| 5,701,469 A | | 12/1997 | Brandli et al. |
| 5,727,057 A | | 3/1998 | Emery et al. |
| 5,737,533 A | * | 4/1998 | De Hond ............... 395/200.49 |
| 5,740,549 A | | 4/1998 | Reilly et al. |
| 5,764,736 A | * | 6/1998 | Shachar et al. .......... 379/93.23 |
| 5,771,280 A | * | 6/1998 | Johnson ................... 379/93.23 |
| 5,790,121 A | * | 8/1998 | Sklar et al. ................. 345/356 |
| 5,835,236 A | | 11/1998 | Barbari |
| 5,844,597 A | * | 12/1998 | Kettler et al. ............ 379/93.21 |
| 5,867,494 A | | 2/1999 | Krishnaswamy et al. |
| 5,914,951 A | * | 6/1999 | Bentley et al. ............. 379/265 |
| 5,919,247 A | | 7/1999 | Van Hoff et al. |
| 5,930,474 A | * | 7/1999 | Dunworth et al. ............ 707/10 |
| 5,938,721 A | | 8/1999 | Dussell et al. |
| 5,944,768 A | | 8/1999 | Ito et al. |
| 5,944,769 A | * | 8/1999 | Musk et al. ................. 701/201 |
| 5,948,040 A | * | 9/1999 | DeLorme et al. ........... 701/201 |
| 5,990,886 A | * | 11/1999 | Serdy et al. ................. 345/329 |
| 5,999,525 A | | 12/1999 | Krishnaswamy et al. |
| 6,067,500 A | | 5/2000 | Morimoto et al. |
| 6,138,162 A | | 10/2000 | Pistriotto et al. |

OTHER PUBLICATIONS

Mace, T., "The PointCast Network", PC Magazine, Feb. 18, 1997, v16, n4, p. 143.

Loshin, P., "Tune In, Turn On the Web", BYTE, Feb. 1997, v22, n2, p. 145–6.

U.S. patent application Ser. No. 08/901249, Rutledge et al., filed Jul. 28, 1997.

U.S. patent application Ser. No. 09/702,436, Rutledge et al., filed Oct. 31, 2000.

* cited by examiner

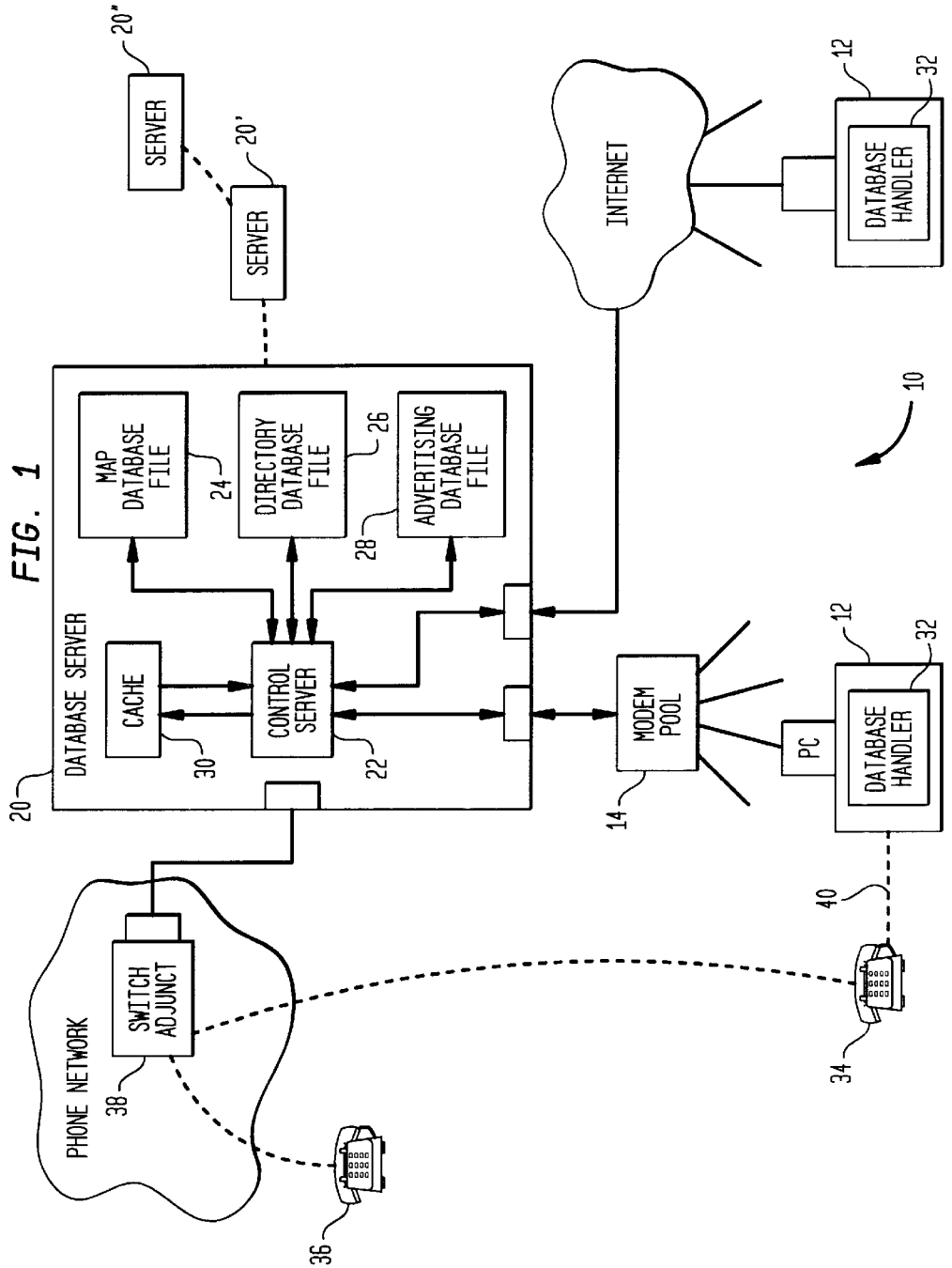

FIG. 4

| UNIQUE ID# | ADDRESS | REDIRECTION BIT | REDIRECTION ADDRESS | RELATED VIRTUAL ADDRESSES | CONNECTION ADDRESS | ALIASES | REF. KEYWORDS | PUBLIC KEY | LOCATION | BUILDING TREE | MAP. REF. | ADVERTISING INFORMATION REF. |
|---|---|---|---|---|---|---|---|---|---|---|---|---|
| | • NAME<br>• POSTAL ADDRESS | EITHER VIRTUAL OR REAL | FOR VIRTUAL TO REAL CONVERSION | | • PHONE NUMBERS<br>  -VOICE OFFICE<br>  -VOICE HOME<br>  -MOBILE<br>• PAGER#<br>• FAX#<br>• E-MAIL<br>• HOME PAGE | • MAIDEN NAME<br>• FAMILY MEMBERS | | | • LONGITUDE<br>• LATITUDE | • BUILDING ID#<br>• PARENT<br>• CHILD | MAP RECORDS ASSOCIATED WITH THIS RECORD | |

FIG. 8H  full directory listing for business

Name:
Sherrill-Lubinski Corporation

Address:
24 Tamal Vista

Suite or Apt:
11

Town or City:
Corte Madera

State:  Zip code:
CA      94925

Voice Phone:
927-111

Fax Phone:
927-773

Mailbox:
927-111

Mobile:

Pager:

Email:
@easylink.att.com

Home page:
http://www         /

ATTID:
.................

Listing Keywords:
software; UNIX; graphical user interface; geographical information system; GUI; automatic code generation ☐ Accept telephone solicitations Aliases:
SL Corporation; Sherrill Lubinski Corp.

Building:
West Tamal Office Plaza; Sherrill Lubinski

Lat: 172.4457    Long: 201.1745

Cancel

Save

Done

FIG. 8I                                full directory listing for individual

Name:
[ Harry Killinger ]

Address:
[ 450 Park ]

Suite or Apt:
[ 12 ]

Town or City:
[ New York City ]

State:      Zip code:
[ NY ]      [ 200 ]

Voice Phone:
[          ]

Fax Phone:
[          ]

Mailbox:
[ 927-111 ]

Mobile:
[          ]

Pager:
[          ]

Email:
[ @trilla .org ]

Home page:
[ http://www ]

ATTID:
[ ................ ]

Listing Keywords:
[          ]

☐ Accept telephone solicitations

Aliases:
[ Nancy Killinger; Nancy Kasselbaum ]

Building:
[ Park Towers West ]

Lat: [ 172.4457 ]   Long: [ 201.1745 ]

[ Cancel ]

[ Save ]

[ Done ]

FIG. 9C search

Enter information you know:

Name:

Address:

Suite or Apt:

Town or City:

State:   Zip code:

Telephone:

Email:

Home page:
http://

Keywords:
absorbents;

- absorbents
- abstracters
- accountancy schools
- accountants-certified public
- accountants-public
- acoustical contractors
- acoustical materials
- actuaries
- acupuncturists
- addressing machines & supplies
- adhesives & glues
- adjusters
- adolescent & child counseling
- adoption services
- advertising-aerial
- advertising agencies & counselo
- advertising art layout & produc
- advertising-direct mail
- advertising-directory & guide
- advertising-displays
- advertising-newspaper
- advertising-outdoor Searching ◉ Search Current View
○ Search Radius: ▭ miles

[Cancel]
[Search]

Results

Locations found
▨▨▨▨▨▨▨▭▭▭▭  Searching...
        4

[Halt]
[Done]
[View Results]

MAP-BASED DIRECTORY SYSTEM

CROSS-REFERENCE TO RELATED APPLICATIONS

This application is a continuation-in-part of application Ser. No. 08/613,307, filed, Mar. 11, 1996.

FIELD OF THE INVENTION

This invention relates to a directory system, and more specifically to an online communications directory system, which integrates directory features with a map-based graphical user interface utilizing both real and virtual locations.

BACKGROUND OF THE INVENTION

The on-going information revolution has created the opportunity for a major revamping of the way that consumers use the phone system. The current telephone interface, consisting of a keypad and handset, has served well for many decades and will almost certainly continue to remain useful. The telephone numbering system has also functioned well in a world in which the communications system is voice-based. Contacting individuals, however, can be expected to become increasingly complex in the near future. At any given location, pertinent contact information may include voice numbers, fax numbers, E-mail addresses, home page URL's, and in the near future, Internet phone addresses and video phone numbers.

While the proliferation of means for communication promises increasing contacts between individuals, both in terms of quality and quantity, the burden of managing the proliferating number of contact addresses falls on the end users, who must maintain a personal database related to such information. Furthermore, in order to obtain such additional information, it is often necessary to first contact the individual or the entity and collect it. Directory assistance services only provide the telephone number of the party. However, such directory assistance services require the user to first specify the geographical location of interest before a listing can be provided.

In many cases, in addition to obtaining telephone number and other pertinent information related to a listing, it is necessary to ascertain the precise geographic location of a desired party. In such cases the user of the currently available directory assistance services has to first contact the desired party and obtain their address and preferably street directions, in order to be able to travel to the desired party. In the alternative, the user may refer to a map to find the exact location of the desired party. In other cases, a user who is not familiar with a geographical region may need to know the locations of various establishments within the region. For example, the user may need information to contact and locate restaurants, movie houses, dry cleaners, schools, shops and places of worship that are located within a predetermined area. The current directory assistance services are not capable of providing such information in a user-friendly manner.

Recently created CD-based directory assistance products, which provide telephone listings on a national basis, still do not provide information to help the user to visualize and determine the geographical environment of the listing at the building level.

Thus, there is a need for a directory assistance system that allows users to locate listings in conjunction with geographical information related to such listings.

SUMMARY OF THE INVENTION

A technical advance is achieved in the art by providing a method and system for providing a map-based directory service.

Users of the map-based directory service are presented with a map on a computer screen, the map having symbols indicating real-world locations such as buildings, streets, parks, and bodies of water. A close correspondence exists between the map and the real-world. The map further has symbols indicating virtual locations. A virtual location, as the name implies, refers to a location that appears on the map but is not physically present in the real world. In accordance with the present invention, users can locate listings in conjunction with both real and virtual locations related to such listings, and, can connect to the entities associated with those listings once located.

In one advantageous embodiment, map-based directory services are provided by generating for display on a display screen an image of a geographic region, wherein an icon representing a location of an entity is depicted on the image, and establishing a connection between a first communication device located in proximity of the display screen and a second communication device located in proximity of the entity, in response to a request for communication with the entity.

In an alternate embodiment, the icon depicted on the image of the geographic region represents a virtual location of an entity. In accordance with this embodiment, a limousine service located in the suburbs can establish a virtual location at an urban airport to gain exposure to and receive calls from the large number of travelers who can be expected to use the map-based directory service to gather information regarding services available in the vicinity of the airport. Such virtual locations are distinct from the virtual malls of the internet, which provide neither a geographical reference nor the ability to connect to anything other than a home page. Moreover, such virtual locations can be provided at low cost to the operator of the map-based directory service, while providing tangible economic benefits to both users of the directory service and advertisers.

Other and further aspects of the present invention will become apparent during the course of the following detailed description and by reference to the attached drawings.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may be best understood by reference to the following detailed description when read with the accompanying drawings in which:

FIG. 1 illustrates a block diagram of a communications network that employs an embodiment of a map-based directory system 10 in accordance with the present invention.

FIG. 4 illustrates the data structure of a directory database file in accordance with one embodiment of the present invention.

DETAILED DESCRIPTION

Figure 2A:
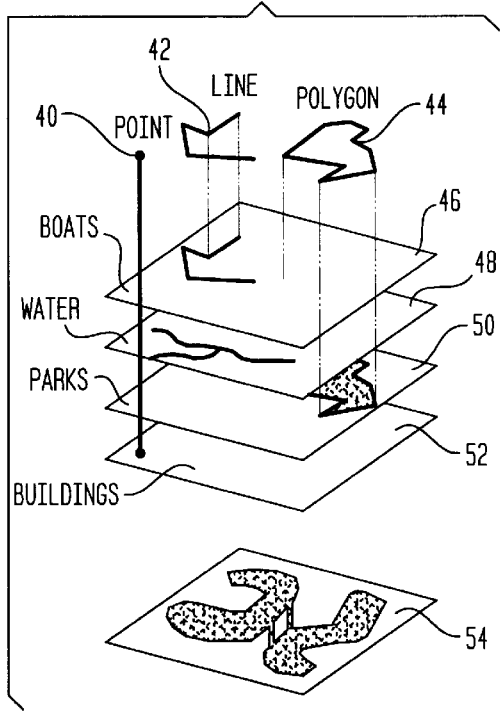
FIGS. 2a and 2b illustrate two embodiments of data structure wherein spatial data in a map database file is stored in accordance with the present invention.

FIG. 1 illustrates a block diagram of a communications network that employs an embodiment of a map-based directory system 10 in accordance with the present invention. A plurality of display terminals such as personal computers 12 are configured to access a database server 20, advantageously via a modem pool 14, although the invention is not limited in scope in that respect. For example, personal computers 12 may also access database server 20 via a computer communications network 16, such as the Internet.

Database server 20 includes a map database file 24, which preferably stores information relating to a plurality of geographical locations as will be discussed in more detail hereinafter. Database server 20 also includes a customer directory database file 26, which preferably stores information relating to entities, such as business and residential customers. This information preferably includes name, telephone number and other information as will be discussed in more detail hereinafter. In addition, database server 20 includes an advertising database file 28, which preferably includes advertising information relating to entities having information stored in directory database file 26.

A control server 22 manages and supervises the activities of database server 20. Control server 22 is coupled to map database file 24, directory database file 26 and advertising database file 28. In a preferred embodiment of database server 20, control server 22 is also coupled to a cache 30. Database server 20 receives requests for information from computer terminals 12, and in response to such requests takes appropriate actions as will be discussed in more detail hereinafter.

Database server 20 is advantageously coupled to a telephone network 36, which includes a plurality of switch adjuncts 38. The operation of telephone network 36 and switch adjunct 38 is well-known. Advantageously, map-based directory system 10 includes a plurality of database servers 20', 20", coupled together in a communications network, such that each database server is able to share its own data with the remaining database servers.

As will be discussed in more detail with reference to FIG. 5b, switch adjunct 38 is configured to establish a telephone communication between a phone 34, which is locally situated near personal computer 12, and a remote phone 36, which is desired to be accessed. In operation, switch adjunct 38 receives two telephone numbers from database server 20. The first telephone number relates to the calling party and the second telephone number relates to the called party. In response to these two telephone numbers, switch adjunct 38 establishes a bridge connection between phones 34 and 36. Accordingly, switch adjunct 38 sends a ring signal to telephone 34 to indicate that a bridge connection with the called party has been established. At about the same time, switch adjunct 38 also sends a ring signal to telephone 36, so that the called party is notified of a phone call.

It will be appreciated that the present invention is not limited in scope in this particular context. For example, once the telephone number of a desired party has been identified, computer terminal 12 may initiate a phone call directly from telephone 34. With this alternative embodiment, telephone 34 is coupled to computer terminal 12, as illustrated by dotted line 40.

Furthermore, in accordance with another embodiment of the invention, components employed by database server 20 may alternatively be located at the site of computer terminal 12. In this particular context, database files 24, 26 and 28 may be stored on a CD-ROM product, which is configured to be controlled by computer terminal 12. A software program, installed on computer terminal 12, provides the functions of database server 20 to manage and retrieve data from the database files. In accordance with this embodiment of the invention, telephone set 34 is coupled to computer terminal 12.

When the user decides to make a phone call to a desired entity, computer terminal 12 initiates a phone call directly to telephone set 36 by dialing the desired entity's telephone number. For this particular embodiment of the invention, the user needs to update the contents of the database files periodically by either buying updated CD-ROM products or downloading updated information from a service provider.

However, establishing a telephone call by a service provider, instead of the user, in accordance with the particular embodiment of the invention, as described with reference to FIG. 1, has may advantages, some of which are explained hereinafter. For example, this arrangement may be more convenient for the calling party and the service provider of map-based directory system 10. The calling party is relieved from interfacing a telephone unit with a computer, which may be an inconvenience. Furthermore, the service provider can monitor the use of its services more readily, by knowing the number of calls made to a particular location. As will be explained in more detail hereinafter, many entities that are listed in directory database file 26 may desire to provide advertising messages, when they are selected by a user. The service provider can provide detailed marketing analysis to such entities by knowing the number of calls made to an entity in response to such advertising messages. Such a communication scheme may also lead to additional phone traffic for the telephone service carrier and customer retention.

In accordance with one embodiment of the present invention, each computer terminal 12 includes a database handler 32, which is configured to transmit to and receive information from database server 20, and to manipulate the data that it receives from database server 20. In one embodiment of the invention, database handler 32 is configured to operate in accordance with principles of a geographic interface system (GIS). To this end, database handler 32 receives information relating to geographic locations, which are retrieved from map database file 24 and combines this information with predetermined information retrieved from directory database file 26 and advertising database file 28.

The operation of geographic interface systems (GIS) is well-known and described, for example, in: (1) *SAGE Introductory Guidebook*, Robert M. Itami and Robert J. Raulings, DLSR (Melbourne, Australia, 1993); (2) *Principles of Geographical Information Systems for Land Resources Assessment*, Clarendon Press, Oxford University Press, (New York 1986); (3) *Geographic Information Systems: A management perspective*, Aronoff, Stanley WDL Publications, (Ottawa, Canada 1989); and (4) *Geographic Information Systems: An Introduction*, Star, Jeffrey, and Estes, John E. Prentice-Hall, Inc. (Englewood Cliffs, N.J. 1990). Commercially available geographic information systems may be obtained from Eliris, Inc., and Arc/Info, Inc.

Generally, database handler 32 is a computer program installed in each computer terminal 12. In accordance with one embodiment of the present invention, database handler 32 operates as a geographic information system (GIS). Database handler 32 is used for retrieving, analyzing, and displaying map data, corresponding to geographical maps, stored in map database file 24 in conjunction with customer record data stored in customer directory database file 26. To this end, the Earth's features are not only represented in pictorial form, as in conventional paper maps, but as information or data.

The data stored in map database file 24 contains all the spatial information relating to conventional geographical maps. With the aid of a geographic information system (GIS), this spatial data is advantageously displayed, on computer terminal 12, just like a paper map with roads, rivers, vegetation and other features represented as lines on a map complete with legend, border and titles. At least one important feature of geographic information systems (GIS's) is that the information stored in map database file 24 is stored in a structured format referred to as a spatial database. The way spatial data are structured allows the user to store, retrieve and analyze the information.

Figure 2B:
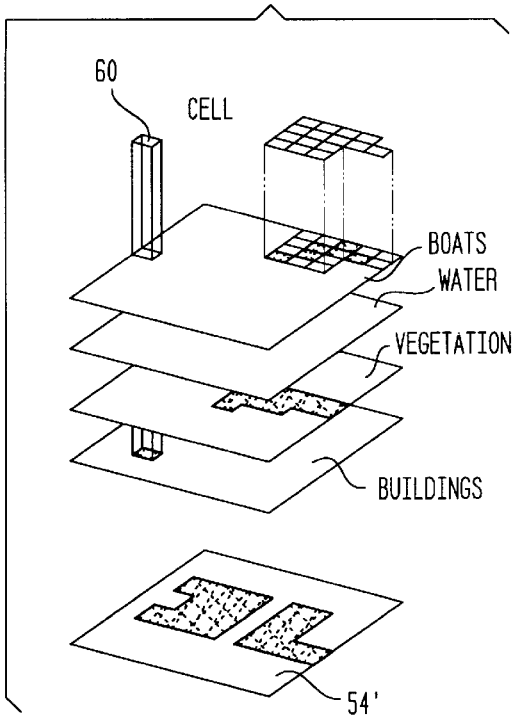

FIGS. 2a and 2b illustrate two examples of methods wherein spatial data in map database file 24 is stored. FIG. 2a illustrates an example, where map features are stored in vector format. To this end, data is stored as a series of points, lines and polygons, such as points 40, lines 42, and polygons 44, with a substantially high degree of accuracy. In accordance with one embodiment of the invention, buildings are preferably represented as polygons or points having a given size corresponding to the actual size of the building. Roads and rivers are preferably represented by lines having given lengths and widths corresponding to their actual dimensions.

FIG. 2b illustrates another example, where map features are stored in raster or grid format. A matrix of cells 60 generalize the location of features on a map. Many geographic information systems may be configured to handle both vector and raster data from a wide variety of sources including satellite imagery, hand digitized maps and scanned images.

As illustrated in FIGS. 2a and 2b map information in map database file 24 is represented thematically. A standard topographic map will show roads, rivers, parks, and building patterns and other features on a single map sheet. In a geographic information system (GIS) these features are categorized separately and stored in different map themes or overlays. For example, roads are preferably stored in a separate overlay 46. Likewise, rivers and streams are preferably stored in a separate overlay 48. Parks are stored in a separate overlay 50, and buildings are stored in a separate overlay 52. This way of organizing data makes maps much more flexible to use since these overlays or themes can be combined in any manner that is useful. Furthermore, updating map information may be accomplished more easily. As illustrated in FIG. 2b, information stored in raster format appears less realistic than that stored in vector format.

In accordance with one embodiment of the invention, each thematic overlay is advantageously separated in additional corresponding overlays, although the invention is not limited in scope in that respect. For example, overlay 46 corresponding to roads, may comprise many road overlays, with roads in each overlay categorized on a hierarchial basis. Preferably, interstate highways are stored in one overlay, and state highways in another overlay and local roads in still another overlay. Likewise, overlay 48, corresponding to parks, may comprise of many park overlays, with parks in each overlay categorized on the basis of size. For example, large state parks may be stored in one overlay, and smaller city and neighborhood parks may be stored in another overlay. This overlay categorization, allows the user to view each retrieved map with a predetermined degree of resolution. As more and more layers are combined, more detail appears on the map being displayed.

Figure 3:
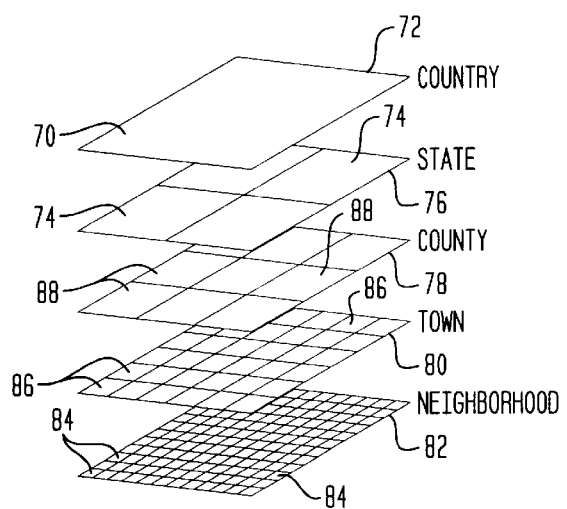
FIG. 3 illustrates an exemplary manner wherein geographical regions available for display are categorized in accordance with one embodiment of the present invention.

In one embodiment of the present invention, geographical regions available for display are also categorized into tiles and zoom layers as illustrated in FIG. 3. For example, various maps with different scales may be stored in map database file 24. FIG. 3 represents an exemplary zoom layer system for a map database system having five zoom layers, with each zoom layer a factor of eight greater in scale than the more detailed zoom layer below it.

For example, zoom layer 72 includes a tile 70 that represents a portion of a general map of a country. Such a map, when displayed on computer terminal 12, illustrates gross details, such as state boundaries. Zoom layer 76 includes a plurality of tiles 74, each of which represent a map relating to one or more states corresponding to the area represented by tile 70. Each tile 74 when displayed on computer terminal 12, illustrates more details of areas contained in a state. Zoom layer 78 includes a plurality of tiles 88, each representing a map of a county corresponding to the area represented by tiles 74. Each tile 88, when displayed on computer terminal 12, illustrates more details of areas contained in a county. Zoom layer 80 includes a plurality of tiles 86, each representing a map of a town corresponding to the area represented by tiles 88. Each tile 86, when displayed on computer terminal 12, illustrates more details of areas contained in a town. Finally, zoom layer 82 includes a plurality of tiles 84, each representing a map of a neighborhood corresponding to the area represented by tiles 86. Each tile 84, when displayed on computer terminal 12, illustrates details of areas contained in a neighborhood, including buildings. FIGS. 2a illustrates an exemplary map tile 54 that is formed by combining thematic layers 46 through 52. It will be appreciated that any combination of thematic layers 46 through 52 may be employed to form a map tile 54.

Each zoom layer corresponds to a predetermined scale. Furthermore, each tile in each layer represents an actual length of a geographic region being represented in accordance with each zoom layer. Using this exemplary scaling system, each tile 84 of zoom layer 82 represents a square area with each side having an approximate length of 2000 feet. Likewise each tiles 86 of zoom layer 80 represents a square area with each side having an approximate length of 3 miles. Tiles 88 of zoom layer 80, each represent a square area with each side having an approximate length of 24 miles. Tiles 74 of zoom layer 76, each represent a square area with each side having an approximate length of 194 miles. Finally tile 70 of zoom layer 72 represents a square area with each side having an approximate length of 1550 square miles.

It is to be noted that a plurality of overlay maps such as 48 through 52 may correspond to each tile. Thus, the system allows each map region to be visualized at a predetermined scale, depending on the zoom layer from which a tile, or portion of a tile, is being displayed. It also allows the user to control the degree of detail that is included in each tile being displayed, depending on the number of thematic layers used in a combination of overlays to display the tile.

In addition to various themes or overlays 48 through 52 and zoom layers 72 through 82, map database file 24 also stores the label information relating to each location. A label information may comprise a text string; location of the label on the map; its orientation and size. Labels can be used for both virtual and real locations on the map.

In order to ensure that all images of maps stored in map database file 24 overlay accurately, the data set is "geo-referenced" to a common coordinate system. For example, Universal Transverse Mercator (UTM) projection is commonly used to define coordinates in the system. This technique is well-known and thus, is not discussed in detail herein.

Map database file 24 represents an object-oriented database, in which each map record or map tile consists of a fist of objects. Table 1 illustrates the data structure of an exemplary map tile, although the invention is not limited in scope in that respect.

TABLE 1

| | |
|---|---|
| Location | This is the reference location of the map tile identified with a unique map tile identifier. |
| Object List | This is a list of map objects, which in general represent entities which can logically carry a single label (whether or not they are labeled). Examples of objects are: overlays that include streets, building outlines, parks, bodies of water, etc.; Labels (text strings, location of labels, orientation, etc.); Polygons (a set of filled polygons, drawn in order); Highlight (areas on the displayed map, which are highlighted, indicating that these areas have been selected); Real/Virtual indicator (indicates whether a location displayed on the map is real or virtual as discussed in more detail hereinafter); Directory Reference (objects that include pointers to directory database file that may be used to establish connections by clicking on the map. These pointers may comprise a unique identifier number ("ID#").) |

Thus, personal computer terminal 12 may allow a user to retrieve and display images corresponding to map tiles or portions of map tiles from map database file 24. Preferably, the user is able to zoom these images, starting at, for example, a very high altitude, where only gross details are visible, e.g., state boundaries, and gradually zoom into a given location until great detail is visible, such as building names, numbers and outlines. In response to a user's commands as discussed in more detail hereinafter, database handler 32 retrieves a selected map tile, and displays all the objects indicated in the corresponding object list of the map record. As stated in Table 1, some locations on the displayed map may be responsive to selection commands of the user. When any of these locations is selected by the user, database handler 32 retrieves the unique identifier number associated with that location, and accesses the directory database file 26, based on that identifier number.

As further indicated in Table 1, some of the locations on the map may be "virtual". Virtual locations are locations that appear on the map but are not physically present in the real world. They do, however, function within the map-based directory system in a manner similar to real locations. Thus, in response to a user's commands, database handler 32 retrieves a selected map tile and will display, one or more virtual locations indicated in the object list of the map record, in addition to any real locations indicated in the object list. When a virtual location is selected by a user, database handler 32 retrieves the identifier number associated with that location and accesses the directory database file 26 to retrieve the virtual location's directory record. The directory record of the virtual location will contain a redirection bit indicating that the directory record corresponds to a virtual location and a redirection address that will point the database handler 32 to a directory record corresponding to a real location. The database handler 32 will then use the information in the real location's directory record to enable the virtual location to, in effect, assume the identity of the real location. The operation of the system in connection with the directory database will be explained in more detail hereinafter.

As one would readily appreciate, the provider of the map-based directory service may identify any number of "desirable" locations on a map as "virtual" subject only to availability. These locations may be offered for sale or rent to businesses that wish to establish a "presence" in a given geographic area. However, because the map-based directory service is potentially used as a traveler's aid, as well as a communications interface, care must be taken to ensure that system users understand that virtual locations on the map are not physically present in the real world. Similar confusion may arise when the directory is being used as a communications interface and the connection to the virtual location involves toll charges incurred by the caller (i.e., the real location whose identity the virtual location has assumed is not local to the area depicted on the map). To this end, the Real/Virtual indicator referred to in Table 1 can be used to ensure that virtual locations are displayed on the map in a different color than real locations so as to eliminate user confusion.

FIG. 4 illustrates the data structure of directory database file 26. Each record in directory database file 26 typically includes information relating to an entity such as a person or a business establishment. Each record preferably contains a predetermined number of attributes or fields, as illustrated, although the invention is not limited in scope in that respect, and either fewer or additional fields may be employed depending on the system requirements.

Each listing or record in the directory database file preferably includes an identifier number field, which contains a unique identifier for the record. The record also includes a postal address field, which may contain the primary name and address of the entity related to that record. The next two fields are a redirection bit field and a redirection address field, which are used only in records corresponding to virtual locations in a manner described in more detail hereinafter. The next field is a related virtual address field, which is populated only in records corresponding to real locations and is used to find all related virtual locations. In the event that a real location "goes out of business" and must be deleted, this field provides the system administrator with a convenient way of tracking down and deleting all related virtual locations. The record in directory database file 26 also includes other connection address fields, containing information such as phone numbers that allow access to the entity, including home phone, office phone, mobile phone, and the like. The connection address field may also include the fax numbers, E-mail addresses, and home page addresses and the like. The next field in the record is the aliases field, which contains alternate names for the directory primary name, such as maiden names, family member names, alternative business names or brand names and the like. The next field in the record is the reference keyword, which includes "yellow pages" category headings used for businesses. The next field in the record contains the public key, which includes information needed for public key cryptographic systems.

The next field in the record contains information relating to longitude and latitude coordinates of the listed entity in conjunction with map tiles associated with the record. The longitude and latitude coordinates are preferably based on a universal geographic reference system. Advantageously, in accordance with one embodiment of the invention, when a record from directory database file 26 is selected, database handler 32 retrieves the longitude and latitude information associated with the record and derives the map tiles that include the location of the record based on that longitude and latitude information. It is to be noted that there may be many map tiles with various scale levels that include the regions identified by the longitude and latitude information.

The next field contains information relating to the building tree path. This field is used when it is desired to locate an entity such as a business or a person within a building. The information relating to the building tree is stored in a parent/child format.

A record that contains the parent information relating to a building tree, includes the location of the building, as identified by the building's longitude and latitude coordinates and the building's identifier number. The remaining fields relating to address, connection address, aliases, reference keywords and public key are configured to be empty. However, the record that contains the parent information, also contains references to child locations, which are locations of persons and entities contained in the parent location. For the records that contain the children information relating to the building tree, data relating to all the fields are preferably present, along with the building's identifier number. As will be explained in more detail hereinafter, when a building location is selected, all entities and persons within the building can also be retrieved, based on the information contained in the building tree field, specifically, the building's identifier number.

The next field is the map reference field, which contains a pointer to all the map tiles or records, which are desired to be associated with this directory record or listing. These map tiles are identified by a unique tile identifier as explained above, in reference with the map database file 24.

An additional field, advantageously includes a pointer to advertising database file 28. The information contained in this field refers to another record in advertising database file 26. When a record from directory database file 26 is selected, database handler 32 determines whether any pointer to advertising database file is present. If so, database handler 32 refers to the pointed record in the advertising database file and retrieves the information corresponding thereto. As mentioned before, such information may include text, audio and video messages relating to a record selected from customer directory database file 24.

In accordance with another embodiment of the invention, in order to preserve the privacy of listed customers, an entry in each one of the fields in directory database file 24, as described above, may be categorized as visible or not visible. Thus, when as a result of a search a customer is located, it is possible to display the field entries that have been designated as visible, and not display the field entries that have been designated as invisible. To this end, users of the system may establish a connection with a found entry, but may not view the information related to the found entry.

In addition to this visibility feature, an entry in each one of the fields described above may be categorized as useable or not useable. Thus, when as a result of a search a customer is located, it is possible to make connection to the found entry based on the useable field entries only.

In addition to visibility and useability features, an entry in each one of the fields described above may be categorized as referenceable. A referenceable entry can be compared against but cannot be viewed directly. For example, the list of aliases related to each entry may be advantageously categorized as referenceable. Thus, any access to the associated entity through an alias may only be accomplished if the user knows the aliases and employs them to gain access to a listed entity.

If a user selects a virtual location, the database handler 32 uses the virtual location's unique identifier number as stored in the map database file 24, in the same manner as if the location were real, to retrieve the corresponding directory record. Although the retrieved record may contain less than all of the above-described information (i.e., several fields may be configured to be empty), it will, in any event, contain a redirection bit, a redirection address for the redirection address field, latitude/longitude coordinates for the location field, and entries for the map reference field. In accordance with one embodiment of the invention, the database handler 32 will follow the redirection address to a more detailed record corresponding to a real location and in this manner, obtain a full "identity" for the virtual location (i.e., the contents of one or more of the fields, such as, e.g., the address and connection address fields, of the real location's directory record will be used for the virtual location). The redirection address is preferably the unique identifier of the record corresponding to the real location.

Thus, as previously mentioned, a limousine service located in the suburbs, but serving an entire metropolitan area, can establish a single virtual presence at an urban airport. Alternatively, a business may wish to "blanket" a large geographic area with virtual locations, all of which point to the same directory entry corresponding to a real location. Thus, a large clothing retailer like L.L. Bean™ can achieve a virtual retailing presence in towns across the country, with each virtual location containing a redirection address which points to the same directory entry for the main store in Freeport, Me.

FIGS. 5 through 13 illustrate an example of the operation of database handler 32 that is configured to query the map-based directory system 10 in accordance with one embodiment of the invention, although the invention is not limited in scope in that respect. As explained above, server 20 stores both spatial and non-spatial data in a database system which links the two types of data to provide flexible and powerful ways of querying or asking questions about the data. According to this embodiment of the invention, various display menus appear on the user's personal computer terminal 12 as illustrated in FIGS. 6 through 10.

Figure 5A:
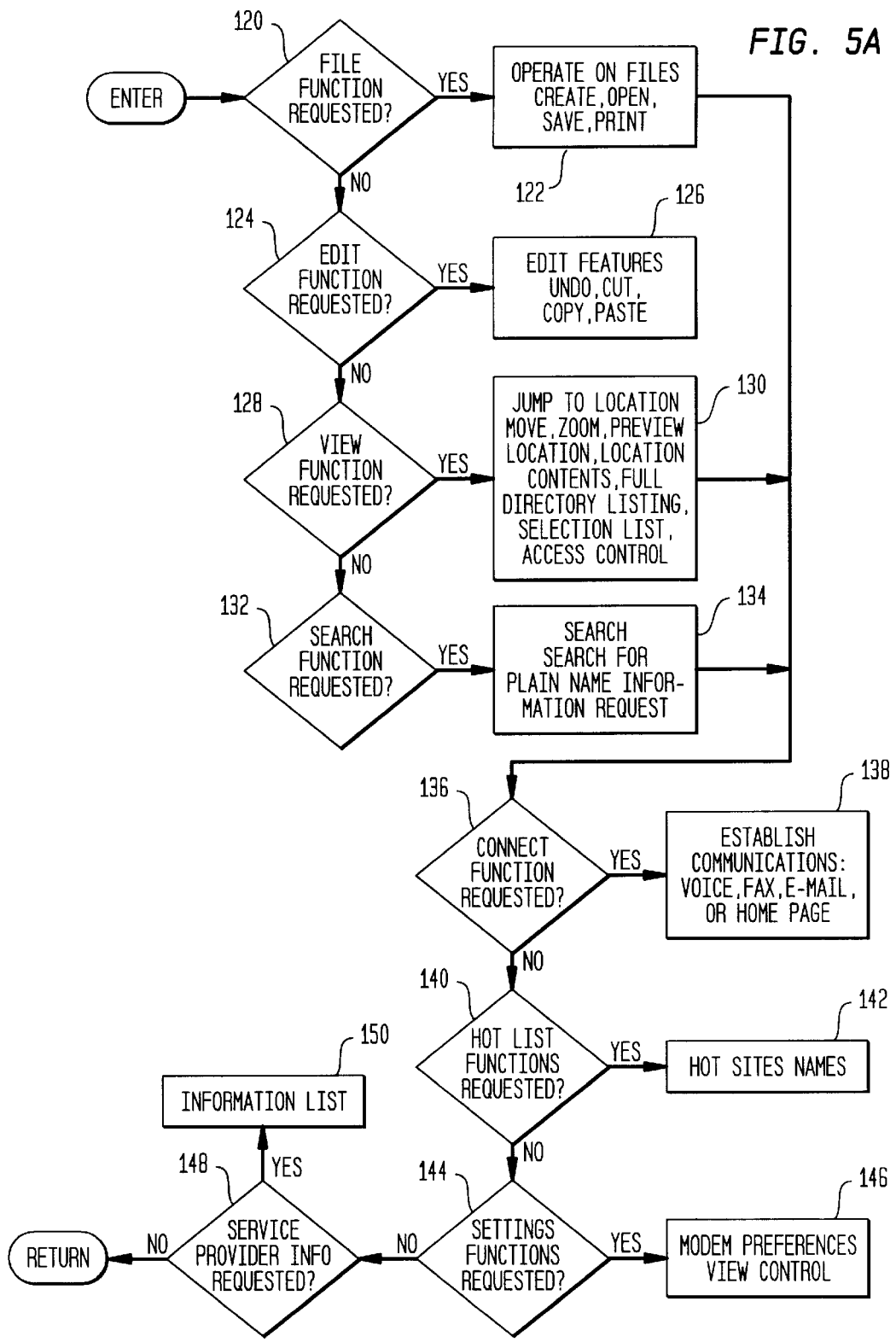
FIG. 5a is a flow chart illustrating the operation of a database handler employed in accordance with an embodiment of the present invention.

FIG. 5a is a flow chart illustrating the operation of database handler 32. Database handler 32 allows the user to request predetermined functions as described hereinafter, although the invention is not limited in scope in that respect. At step 120, database handler 32 determines whether a "file" function has been requested. If so, the system goes to step 122 to make available a plurality of features relating to the "file" function. These features preferably comprise various operations on files such as open, create, save and print. If, however, file function was not requested, the system goes to step 124 to determine whether "edit" function has been requested. If so, the system goes to step 126 to make available a plurality of features relating to the "edit" function. These features may preferably comprise various editing features, such as undo, cut, copy and paste.

If the "edit" function was not selected, the system goes to step 128 to determine whether the "view" function has been selected. If so, the system goes to step 130 to make available a plurality of features relating to the "view" function. These features preferably comprise, jump to location, move, zoom, previous location, location contents, full directory listing, selection list and access control.

If the "view" function was not selected, the system goes to step 132 to determine whether "search" function has been selected. If so, the system goes to step 134 to make available a plurality of features relating to the "search" function. These features preferably comprise, search, search for place name and information request.

In response to features made available at steps 122, 130 and 134, the system determines whether a "connection" function has been selected at step 136. If so, the system goes to step 138 to make available a plurality of communication features to establish communication to a selected location. These communication features preferably comprise, voice call, fax call, E-mail and home page connection.

Figure 5B:
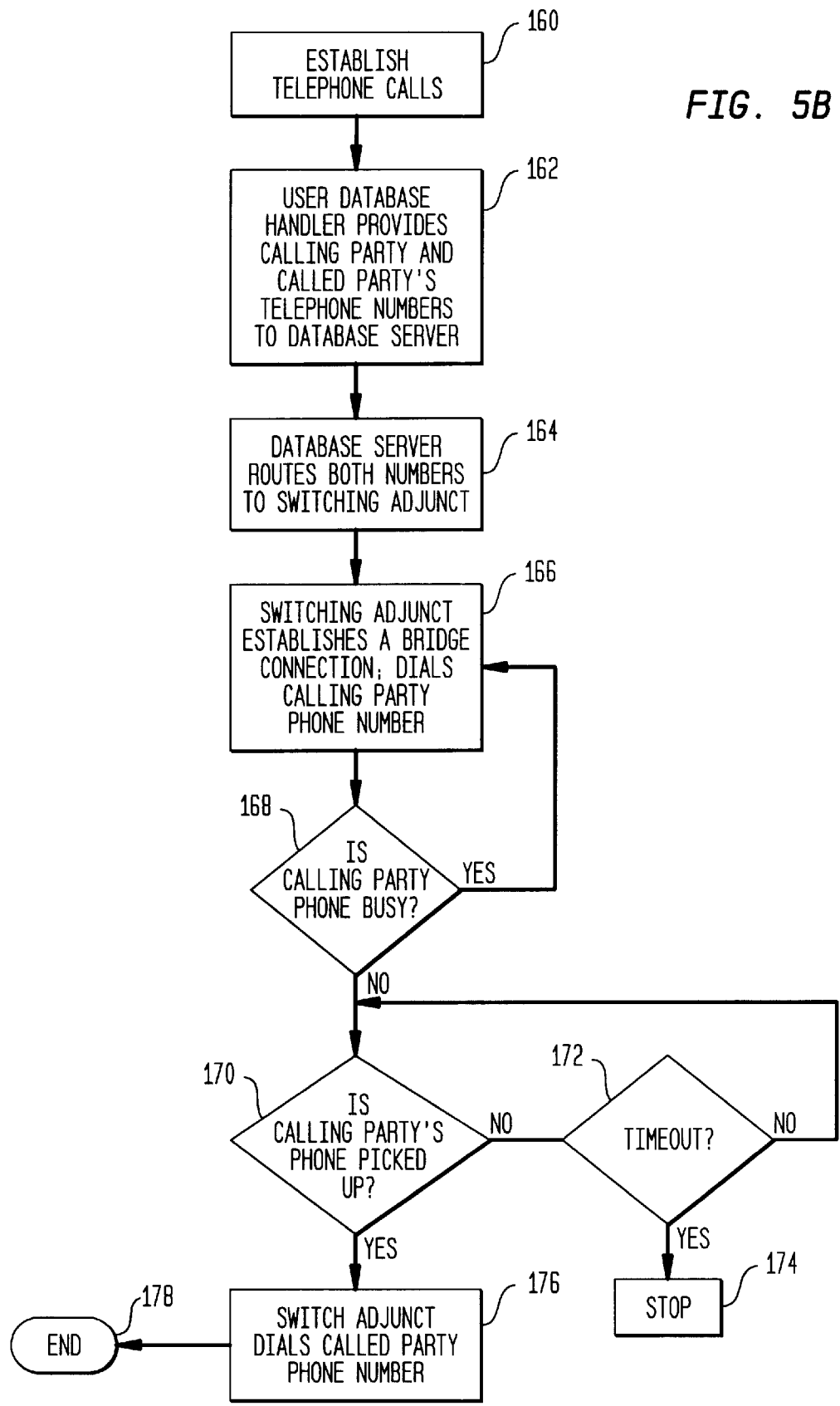
FIG. 5b is a flow chart illustrating the process for establishing a voice call in accordance with one embodiment of the present invention.

In accordance with one embodiment of the present invention, voice calls are advantageously made as illustrated in FIG. 5b. In response to a command to establish a voice connection, database server 20 goes to step 160 to establish a telephone call between the calling party and a selected called party. The system then goes to step 162, at which point database server 20 receives the calling party's and the called party's telephone number. At step 164, database server 20 routes the two telephone numbers to switch adjunct 38 (FIG. 1). At step 166, switch adjunct 38 establishes a communications bridge for use by the calling party and the called party. Switch adjunct 38 then dials the calling party's phone number.

At step 168, the system determines whether the calling party's phone is busy. If so, the system goes back to step 166 and repeats the process until the calling party's phone is not busy. The system then goes to step 170 and determines whether the calling party's phone has been picked up in response to dialing the phone. If not, the system goes to step 172 and determines whether a predetermined time-out has expired. If so, the system goes to step 174 and ends the process. If not, the system goes to step 170 and waits until the calling party's phone is picked up or the time-out has expired, whichever occurs sooner. If the calling party's phone is picked up, the system goes to step 176, at which point switch adjunct 38 dials the called party's telephone number. The system then goes to step 178 and ends the bridging process. From then on, the calling party may establish a voice connection with the called party.

Figure 6A:
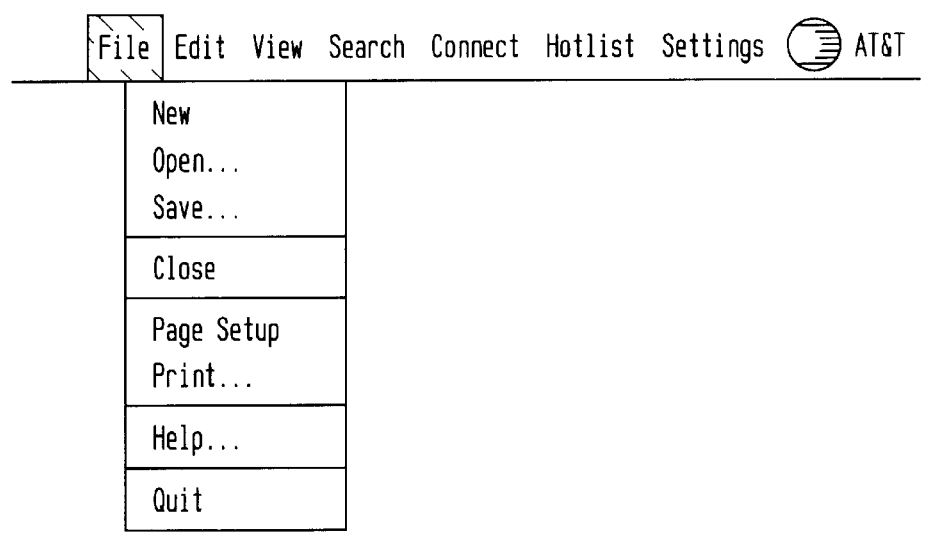
FIGS. 6 through 13 illustrate menu screens available to the user of a map-based directory system in accordance with one embodiment of the present invention.

The user-interface with database handler 32 is described in more detail hereinafter. FIG. 6a illustrates an example of a menu screen that is displayed in accordance with one embodiment of the invention. The menu advantageously includes seven function categories comprising: File; Edit; View; Search; Connect; Hotlist; Settings; and Service Provider as explained above in reference with FIG. 5a, although the invention is not limited in scope in that respect. A user may select any one of these functions, in response to which database handler 32 provides additional options for the user's choice.

Figure 6B:
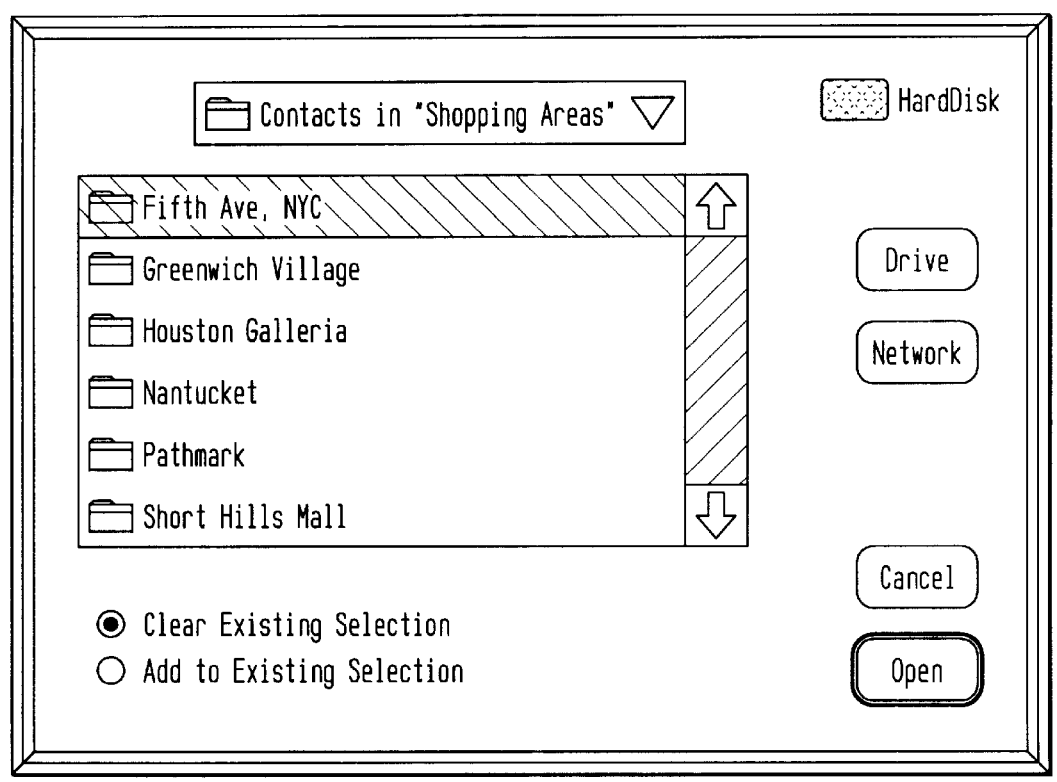
Figure 6C:
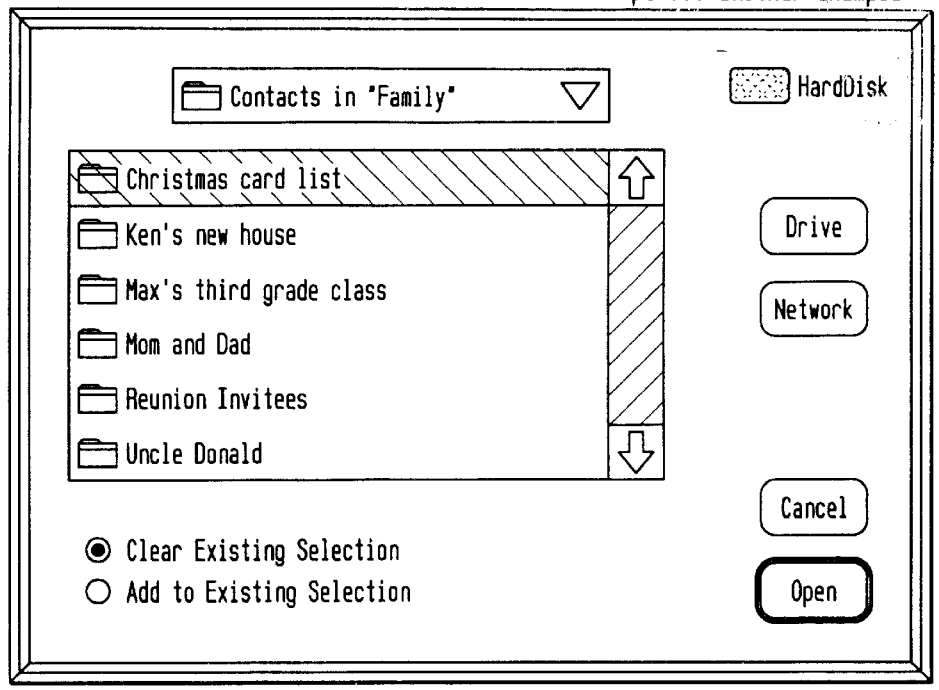

For example, when the user selects the "file" function, a plurality of additional menu options appear as illustrated in FIG. 6a. The file category allows the user to create files that contain useful information accumulated during the use of data handler 32. FIG. 6b illustrates an example of files relating to shopping that have been created by a user, in the form of categories and sub-categories. Database handler 32 allows each previously stored file to be opened in response to the user's selection. FIG. 6c illustrates an example of files relating to family contacts that have been created by the user, in the form of categories and sub-categories. As will be explained in more detail hereinafter, the information relating to each of the sub-categories has been previously stored by either updating the file manually, or retrieving the information from database server 20 in response to a search request.

Figure 6D:
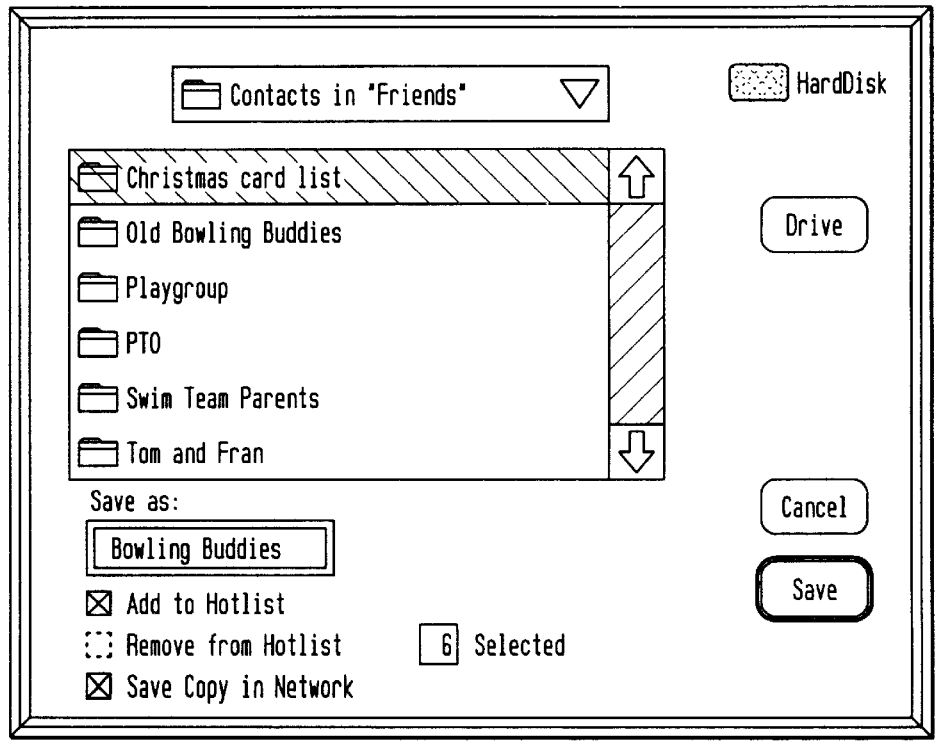

FIG. 6d illustrates an exemplary screen which is displayed on personal computer 12 in response to a save command. This example illustrates that new information is being saved in a category related to "friends" and a sub-category related to "bowling buddies."

Figure 7:
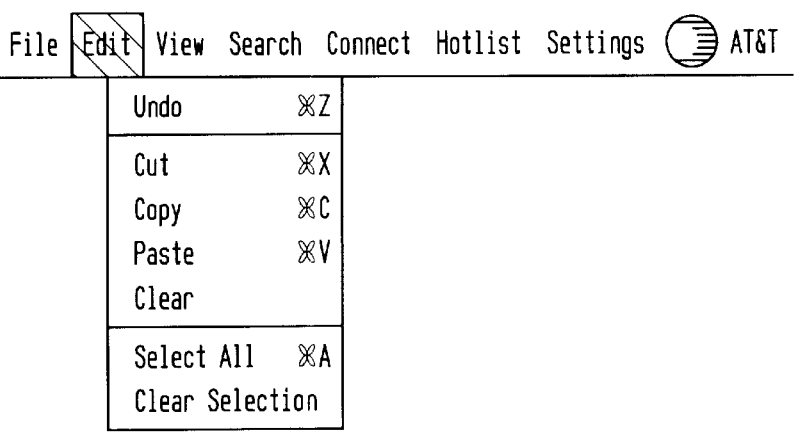

FIG. 7 illustrates the list of menu options that appear in response to selecting the "Edit" function on the main menu screen of data handler 32. The operation of the edit features are well-known, and are not discussed here in further detail.

Figure 8A:
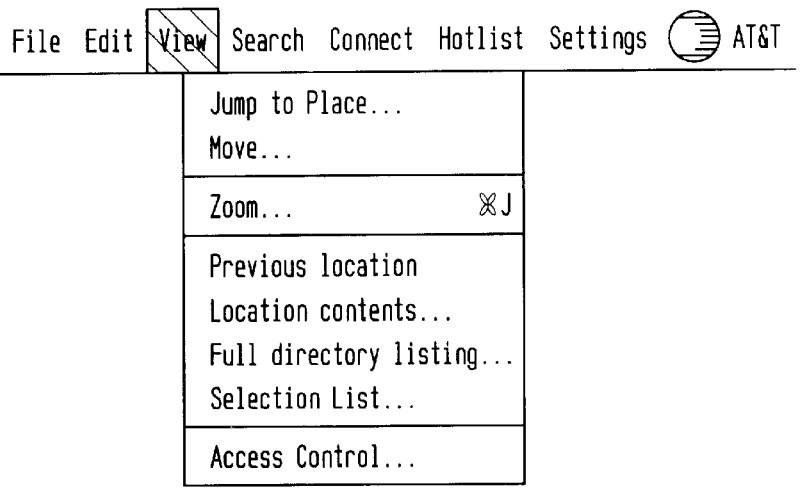
Figure 8B:
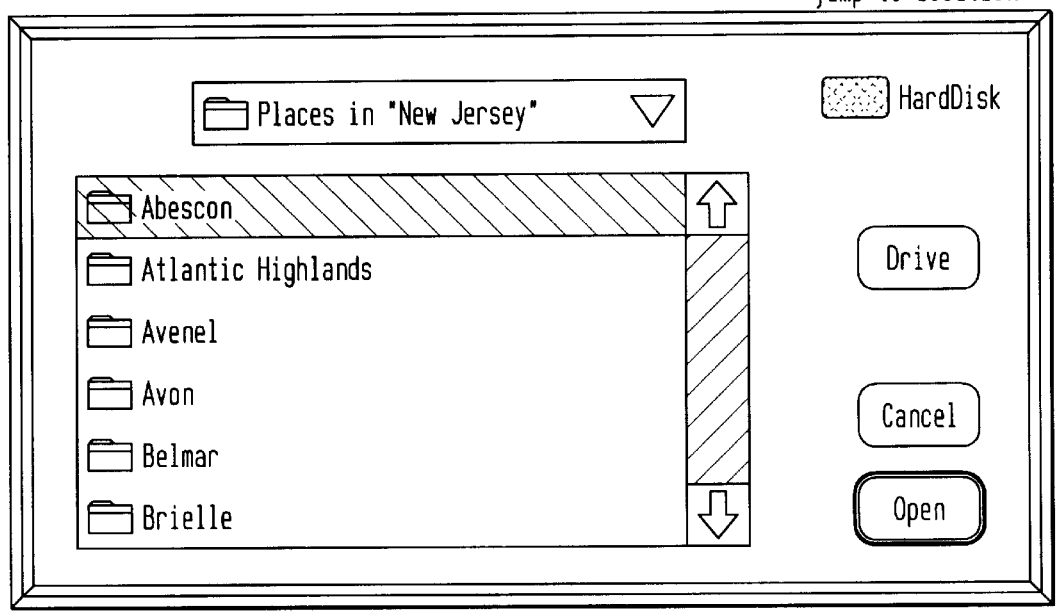

FIGS. 8a–8i illustrate the menu options relating to the "view" function of data handler 32. FIG. 8a illustrates an exemplary menu of features, when the "view" function is selected. In response to the selection of a viewing feature, data handler 32 sends a request to database server 20 to access and retrieve corresponding map tiles stored in map database file 24.

One of the features available under the "view" function is "jump" to a location feature. In response to this request, database server 20 retrieves a list of all available map tiles in a hierarchical order. For example, the user may first browse the list of countries that map database file 24 maintains a corresponding map tile thereto. In response, the user may select a desired country. Database server 20, then provides a list of map tiles that are associated with the desired country. These map tiles preferably relate to a list of states that map database file 24 maintains. In response, the user may select a desired state. Database server 20 then provides a list of map tiles that are associated with the desired state. These map tiles preferably relate to a list of counties that map database file 23. Database server 20 then provides a list of map tiles that are associated with the desired county. These map tiles preferably relate to a list of towns that map database file 24 maintains. Finally, database server 20 provides a list of map tiles that are associated with the desired town. These map tiles preferably relate to a list of neighborhoods that map database file 24 maintains.

At any time during the selection process explained above, the user may generate an "open" command to view a selected region. In response, database server 20 retrieves the map tiles associated with the selected region and transmits the map data to computer terminal 12. Database handler 32 receives the map data and displays the map tiles on the computer screen. Of course, all objects, both real and virtual, indicated in the corresponding object lists of the map tiles are displayed.

Figure 8C:
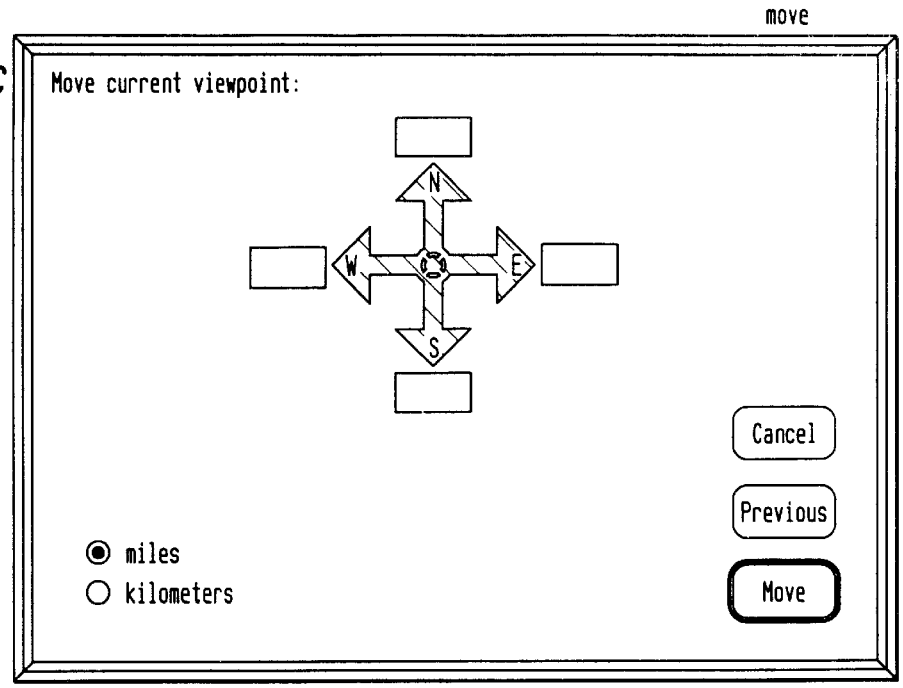

The next feature available under the "view" function is the move command, as illustrated in FIG. 8c. This feature allows the user to move the viewpoint currently displayed on the screen of personal computer 12. In response to this command, database server 20 retrieves corresponding map tiles that are contiguous to the currently displayed map tile. Typically, the user defines the distance and the direction that the current viewpoint is desired to be moved. Based on this requirement all or a partial portion of contiguous map tiles may be retrieved and displayed.

Figure 8D:
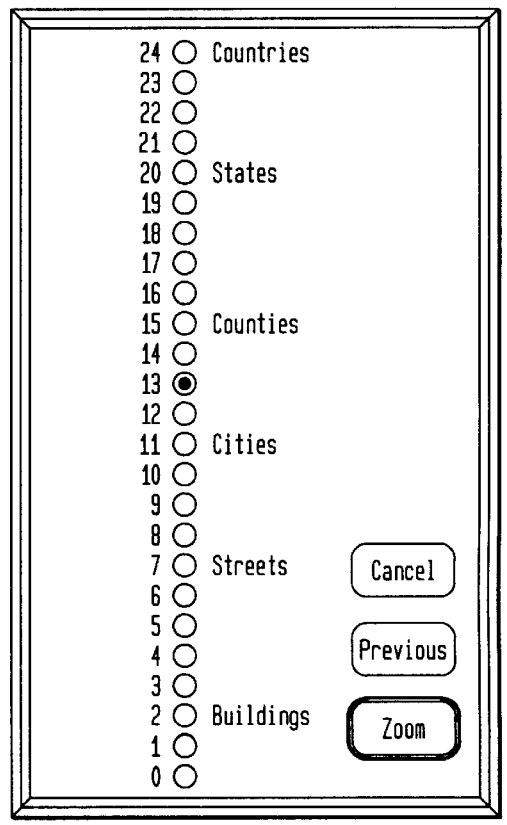

Another feature available under the "view" function is the zoom command, as illustrated in FIG. 8d. This feature allows the user to zoom or pan the viewpoint currently displayed on the screen of personal computer 12. In response to this command, database server 20 retrieves corresponding map tiles with different degrees of resolution. Thus, the user may view a desired location contained within map tiles displayed on personal computer 12. The user may then request a more detailed map of the currently displayed viewpoint. By selecting a desired zoom level database server 20 retrieves more detailed map tiles corresponding to the currently displayed viewpoint. By using the zoom and move features illustrated in FIGS. 8c and 8d, the user may retrieve map data with various scale factors relating to a displayed viewpoint.

Figure 5C:
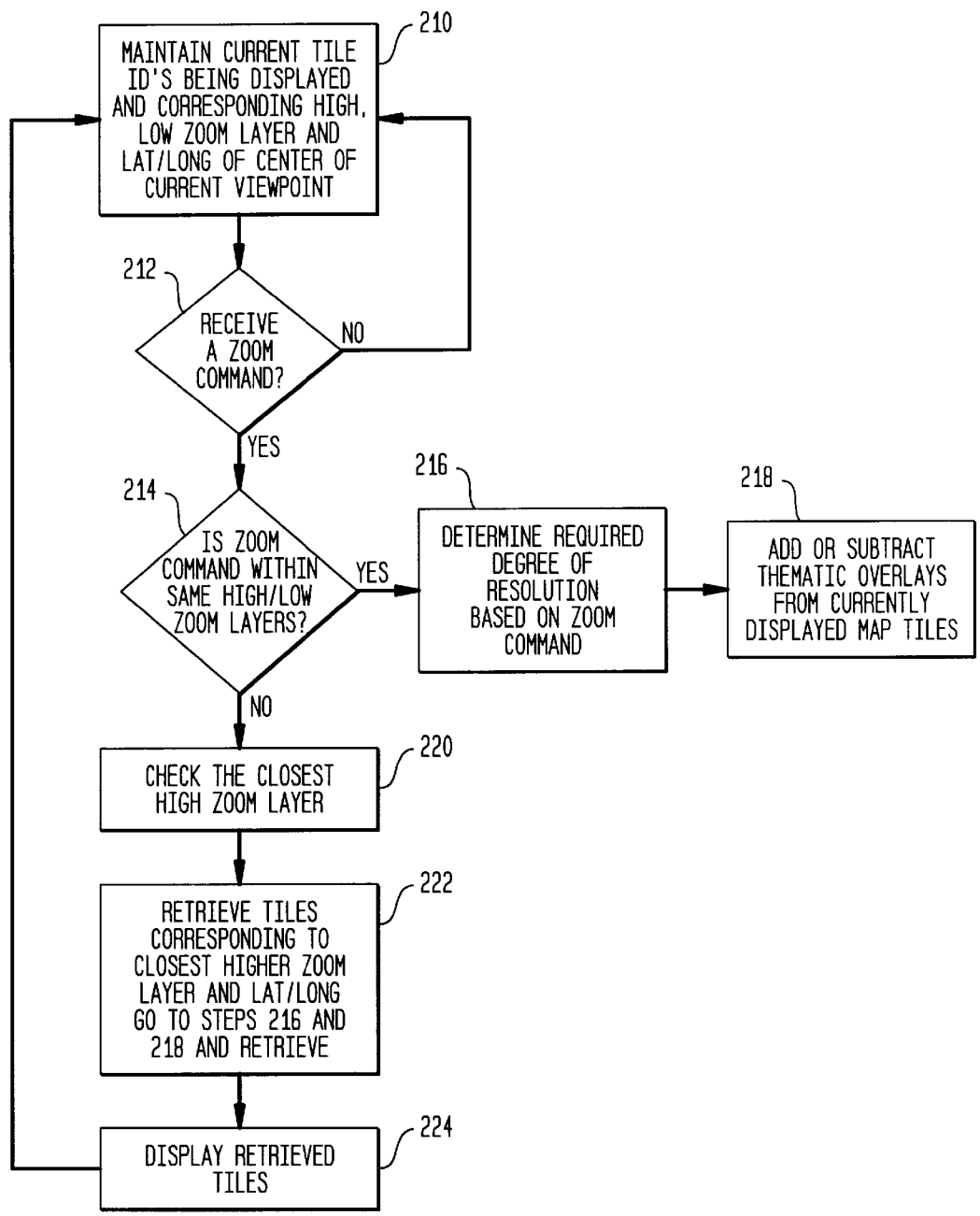
FIG. 5c is a flow chart illustrating the process for varying the zoom level of a map displayed on a terminal in accordance with one embodiment of the present invention.

The "zoom" function is described in more detail hereinafter, in reference with FIG. 5c, which is a flow chart illustrating the process wherein various map tiles are displayed in accordance to a desired zoom layer. Database handler 32, at step 210, maintains the current tile identification numbers related to the map tiles that are being displayed. Database handler 32 also maintains two consecutive zoom layers, within which the current zoom level lies. At step 210, database handler 32 also obtains the latitude and longitude of the location that corresponds to the center of the currently displayed viewpoint.

The zoom levels illustrated in FIG. 8d correspond to the layers discussed in connection with FIG. 3, and advantageously comprise, country, state, county, town and neighborhood zoom layers. As illustrated, each zoom level is identified by a number, preferably ranging from "0" to "24", where "0" corresponds to map tiles with highest degree of resolution and "24" corresponds to map tiles with the lowest degree of resolution. Zoom level 7 coincides with zoom layer 82 of FIG. 3. Likewise, zoom level 11 coincides with zoom layer 80 of FIG. 3. Zoom level 15 coincides with zoom layer 78 of FIG. 3. Zoom level 20 coincides with zoom layer 76 of FIG. 3, and zoom level 24 coincides with zoom layer 72 of FIG. 3.

At step 212, database handler 32 determines whether a zoom level command has been generated. If not, the system goes back to step 210 and maintains the same information it had maintained before. If, however, at step 212 a new zoom level command has been generated, the system goes to step 214 to determine whether the new zoom level falls within the same two consecutive zoom layers that were maintained at step 212. If so, the system goes to step 216 to determine the degree of resolution required on the same map tiles being currently displayed, based on the zoom level command. If the zoom level command has been decreased, the system adds additional thematic overlays to the currently displayed map tiles, as discussed in connection with FIG. 2 to increase the details being currently displayed. If the zoom level command has been increased, the system subtracts thematic overlays from the currently displayed map tiles, as discussed in connection with FIG. 2.

If at step 214, database handler 32 determines that the new zoom level command falls outside the two consecutive zoom layers that were maintained at step 210, the system goes to step 220 to obtain the next higher zoom layer. The system then goes to step 222 to retrieve map tiles corresponding to the obtained zoom layer and the latitude and longitude information maintained at step 210. The system then repeats steps 216 and 218 to obtain thematic overlays corresponding to an appropriate resolution. The system then goes to step 224 and displays the retrieved map tiles. Thereafter the system goes to step 210 and repeats the process described above.

Figure 8E:
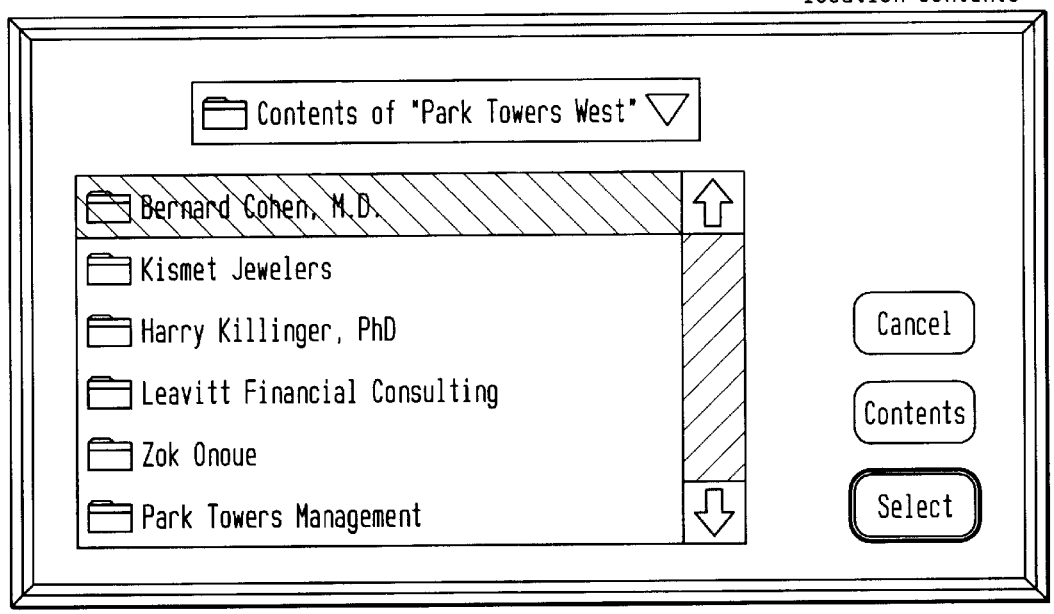

Another feature available under the view command is location contents as illustrated in FIG. 8e. As previously mentioned, some locations on the displayed map may be responsive to selection commands of the user. When any of these locations are selected by the user, database handler 32 retrieves the unique identifier number associated with that location, and accesses the directory database file 26, based on that identifier number. For example, the user may advantageously select a building on the displayed map, by positioning a cursor on the desired location and generating a selection command. Such a selection process, in accordance with one embodiment of the invention, may be advantageously implemented by a computer mouse, which is well-known. The user controls the movement of a cursor on the displayed image by moving the computer mouse on a flat surface, and generates a selection command by clicking a button on the mouse.

Thereafter, by selecting the "location contents" option from the viewing menu, data server 20 retrieves from directory database file 26 a list of all directory records that include the building identifier number associated with the building selected by the user. For example, FIG. 8e illustrates that the user has selected to view the contents of an office building. In response to such a selection a list of all the entities contained in the building are displayed on the computer terminal. Moreover, in accordance with one aspect of the invention, some of the locations within the office building may be virtual, in which case the directory records corresponding to those locations would contain the building's identifier number, in addition to entries in the redirection bit, redirection address, location and map reference fields as previously discussed. Thus, the present invention advantageously permits, e.g., a copy service to establish a virtual presence next to a real law firm within a real office building.

Figure 8F:
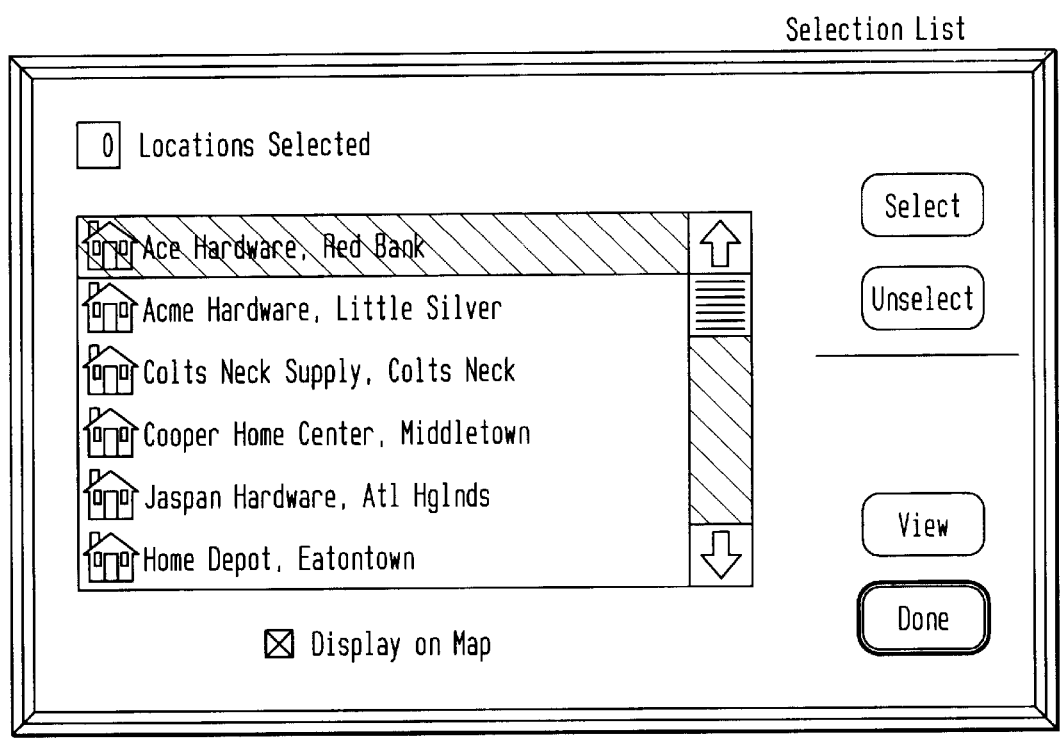

During a viewing session, the user may select many different locations on the maps displayed on the computer screen. The "selection list" feature under the "view" function, as illustrated in FIG. 8f provides the user with a list of all the locations that have been selected during the viewing session. Furthermore, each of the selected locations may be viewed again by generating a "view" command as provided by the selection list feature. In response to the view command, data handler 32 transmits the map tile identification numbers related to the selected location.

Furthermore, during a viewing session, whenever a location is selected from the displayed map, or in the alternative from a displayed list of locations, database handler 32 refers to the advertising field in directory database file 26 to determine whether an advertising message is associated with the selected location. It is to be understood that if the selected location is virtual, the database handler 32 will refer to the advertising field of the corresponding real location's directory record. If the advertising field is empty, database handler 32 refers to map database file 24 to set the contents of "highlight" in the object list to "on." In response, the object relating to the highlight field may include commands to cause graphical changes, such as displaying colored icons at the location selected by the user. Thus, the selected image may advantageously appear as a colored icon. If, however, the advertising field is not empty, database server 20 retrieves the contents of the advertising message from advertising database file 28 for display on computer terminal 12. Such advertising messages may include information related to audio/video and image signals for display on personal computer 12.

Figure 8G:
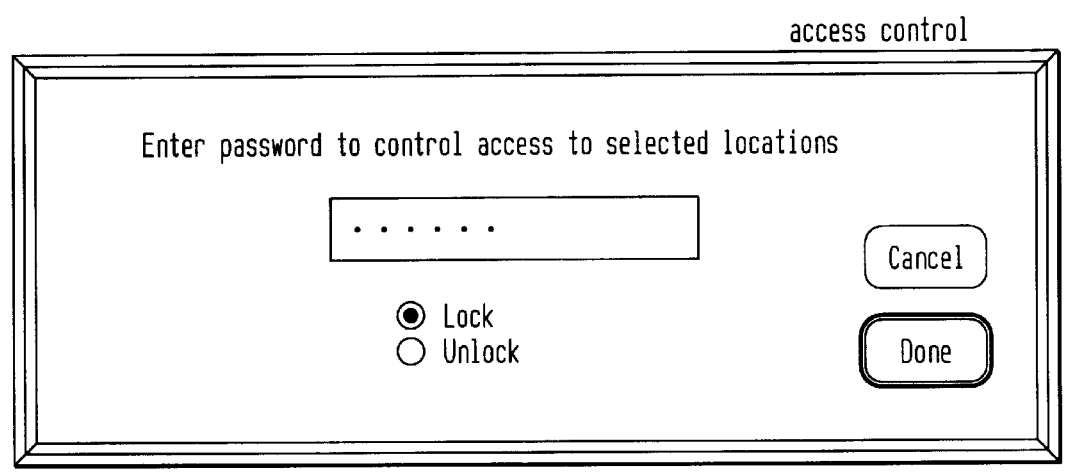

Another feature available under the "view" function is password access as illustrated in FIG. 8g. For certain entries, database handler does not allow viewing features to display information related to a selected location. For such entry, the user must enter a password that allows access to the related information.

Another feature available under the "view" function is the full directory listing as illustrated in FIGS. 8h and 8i. FIG. 8h relates to a directory listing for businesses, and FIG. 8i relates to a directory listing for individuals. Once a location is selected from either, generating a command by positioning a cursor on the displayed map, or selecting a location from one of the lists discussed above, the full directory listing associated with the selected location may be advantageously viewed by selecting the full directory listing feature. If the selected location is virtual, the directory listing displayed is that of the corresponding real location's directory record.

Figures 9A, 9B:
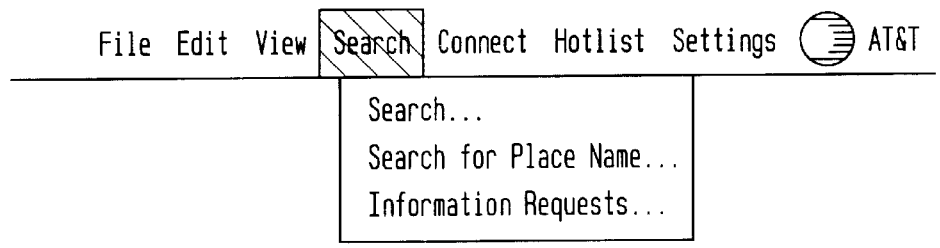

FIGS. 9a through 9c illustrate the menu options available under the "search" function. As illustrated in FIG. 9a these options comprise a search feature, search for place name and information requests. FIG. 9b illustrates the screen displayed in response to the user's selection of information request feature. Database handler 32, in conjunction with the information request feature, queries where the user desires to search. Database handler provides three options for the user's choice, including an unrestricted area, or a desired radial distance from the user's base location or "home", or a desired radial distance from the user's current view as retrieved in accordance with the viewing feature described above.

Furthermore, database handler 32, in conjunction with the information request feature, also queries the desired duration of the user's request. Database handler provides an optional period, such as a day, a week or a month. During the selected period, database handler periodically sends search commands to database server 20 to retrieve the requested information.

The information request feature also queries the user for a desired keyword of the user's interest area. Database handler 32 provides a list of keywords for business categories based on the "yellow pages" keywords. Thus, the user is allowed to search for a desired business category within a desired geographical region for a predetermined period of time. Database handler 32 transmits the information request queries to database server 20. In response, database server 20 searches directory database file 26 in accordance with the search parameters, and retrieves all the directory records that meet the search parameters. Database handler 32 queries the advertising field in directory database file 26. If the contents of the field refer to an advertising record in advertising database file 28, the information relating to the advertising message is displayed on computer 12 for the user's information.

FIG. 9c illustrates a "search" feature in accordance with one embodiment of the present invention. The system queries the user for all the information known to the user relating to the entity that is desired to be searched. This includes information relevant to the entity's directory information and possibly a business category based on the "yellow pages" keywords. The system further provides an option so that the user may select the geographical region currently displayed on computer terminal 12 or, in the alternative, a searching region with a selected radial distance. Database handler 32 transmits the search parameters to database server 20, in response to which, the database server 20 searches records in the database directory 26 corresponding to both real and virtual locations in accordance with the search parameters. Thus, the records searched may correspond to both real and virtual locations within the geographic region of interest. However, as previously discussed, records corresponding to virtual locations will contain a redirection address to a real location's record, which, may actually be located outside the geographic region of interest. The record corresponding to the real location is searched in accordance with the search parameters and, as previously discussed, if a "hit" occurs, the virtual location within the geographic region of interest will then assume the identity of the real location. Database server 20 will continue to search database file 26 until all records that satisfy the search parameters are found.

As illustrated in FIG. 9c, the user is allowed to view the results of the search by generating a "view results" command. The content of certain fields relating to the directory database records found during the search are then used to display the found locations on associated maps. These fields include the longitude and latitude parameters and the map references data. The map references data is employed to locate the map tiles that contain the found locations. The longitude and latitude parameters are employed to highlight the locations found on the displayed map. It is noted that relevant map tiles may also be obtained based on the longitude and latitude information as mentioned above. Furthermore, the identification number (ID#) relating to all the found records are advantageously provided in the "directory reference" object of a map database object list related to a found map tile. This provision allows the user to use the cursor to select any one of the found locations on the map and to thereafter establish a connection. For example, if a user selects a virtual location and requests a voice call, as described in more detail hereinafter, database handler 32 will use the identifier number of the selected location (as contained in the map tile's object list) to find the corresponding record in the directory database file 26. As previously discussed, the retrieved record will include a redirection address to a real location's record. Database handler 32 will use the record corresponding to the real location as the identity for the virtual location and thus, will use the connection address (e.g., a telephone number) contained therein as the connection address for the voice call.

Figure 10A:
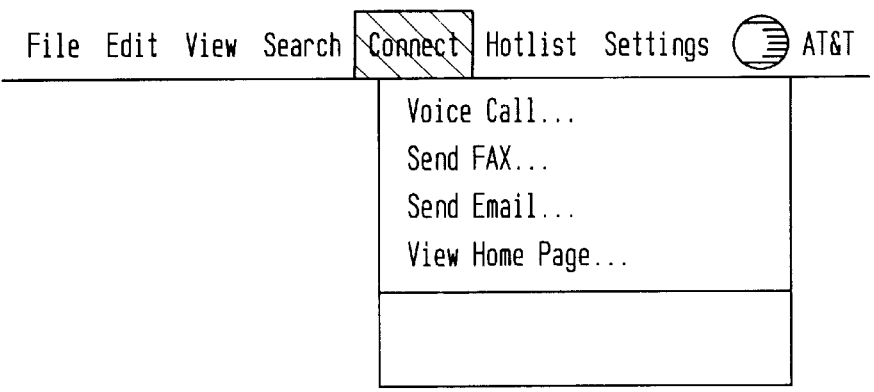
Figure 10B:
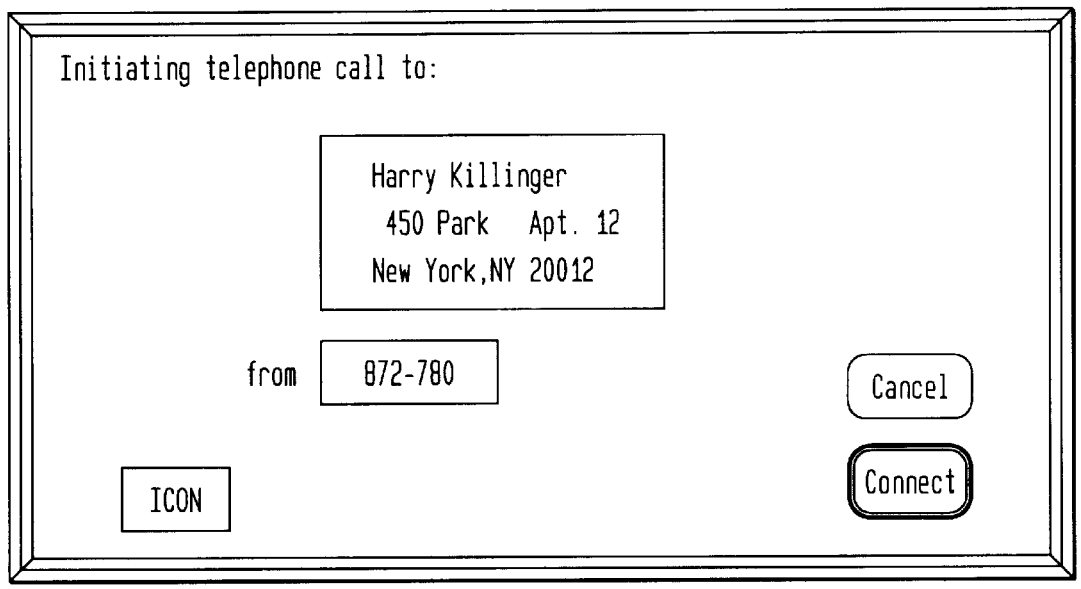
Figure 10C:
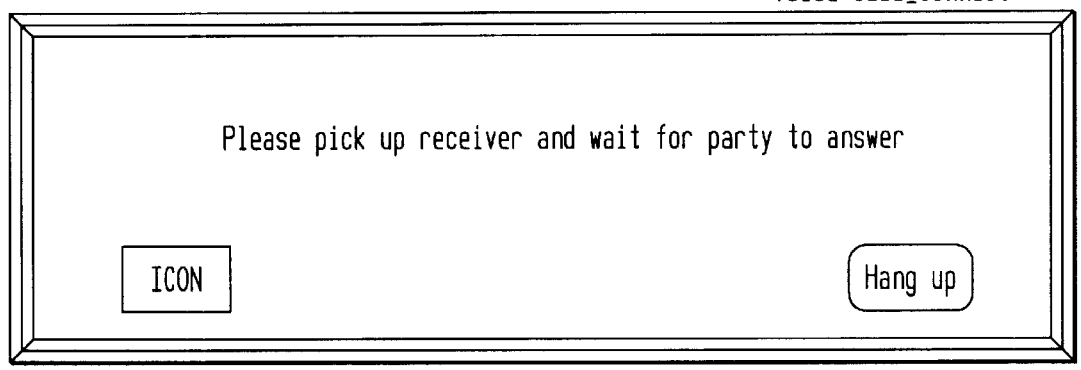

FIG. 10a illustrates the menu of features available under the connect category of database handler 32. These features comprise voice call, fax call, E-mail and view home page. The connect feature may be employed in response to selections made under the "file" function, "view" function and the "search" function as explained before in reference to FIG. 5a. FIG. 10b illustrates the menu screen that is displayed in response to a voice call command. As explained in reference to FIG. 5b, database server 20, in conjunction with switch adjunct 38, initiates phone calls to the calling party and the called party. Once a bridge connection has been accomplished, database server 20 sends a message to database handler 32 as illustrated in FIG. 10c, requesting the calling party to pick up the phone and await the called party's answer. In accordance with an alternative embodiment of the invention, switch adjunct 38 may advantageously send a telephone ring to both parties, once a connection has been established.

Figure 10D:
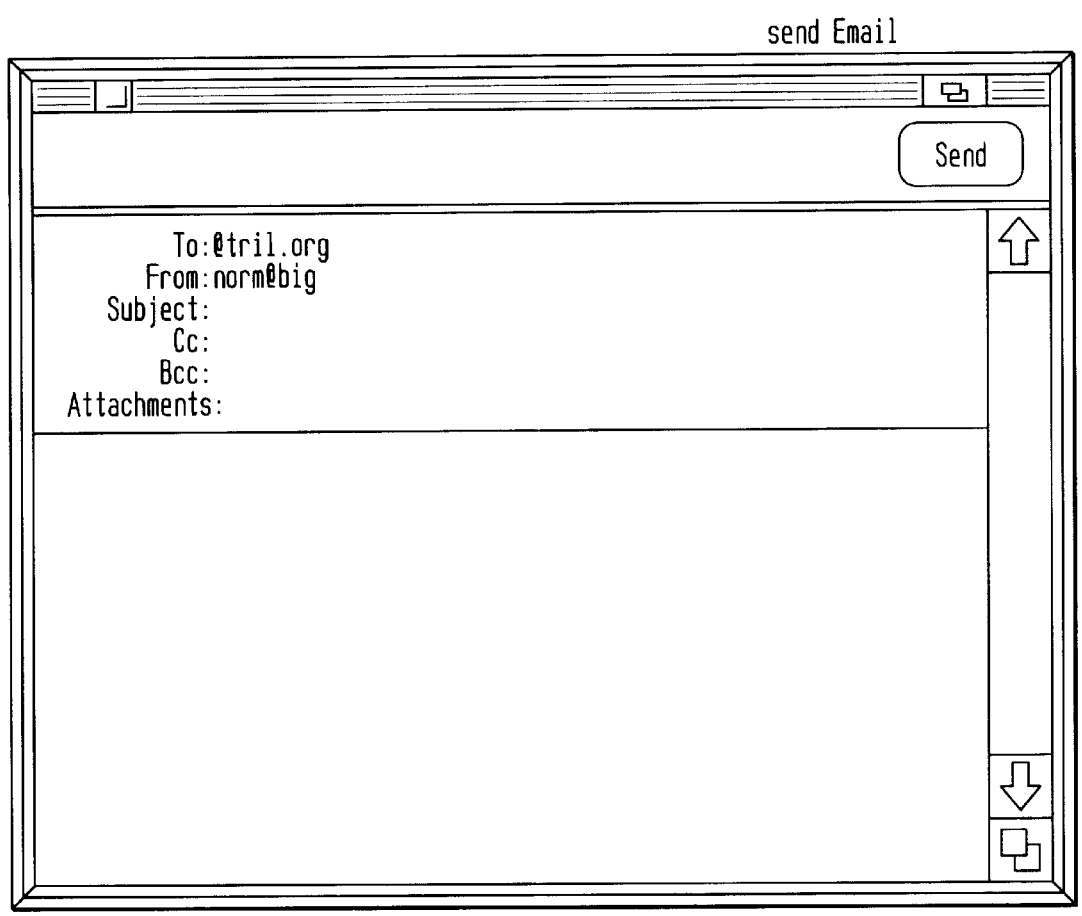

In accordance with one embodiment of the invention, fax calls may be initiated by database server 20 as described hereinafter. In one example for transmitting fax messages, the user may have searched and found a plurality of restaurants within a specified geographical region by employing the search function explained above. The database handler may then obtain and display a map tile that includes the found restaurants as highlighted, preferably by a colored icon. Using the "selection" features explained above, the user may then use a computer mouse and position the displayed curser on one of the highlighted restaurants and click on the mouse button. The "highlight" object field in the associated map record may include a pointer to the advertising database file 28, which includes a menu list and an order page. Database server 20 then transmits the menu and order page for display on computer terminal 12. The user may fill out the order page and select the fax call command to fax the order to the restaurant. Database server 20 receives the order page and establishes a fax call to the restaurant. Database server 20 then transmits a bill relating to the fax call to the user's telephone carrier database. FIG. 10d illustrates a page that is displayed on the user's terminal 12 in response to an E-mail command. It will be appreciated that the E-mail feature may not utilize switch adjunct 38. In response to the E-mail request, database server 20 establishes an E-mail connection through a computer network, such as the Internet.

Figure 11:
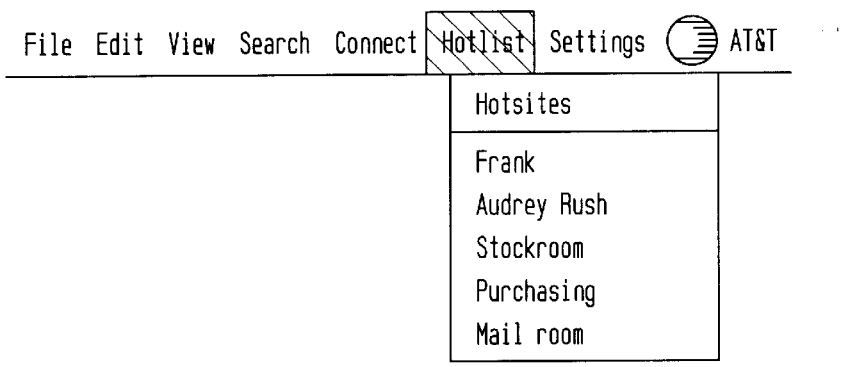
Figure 12:
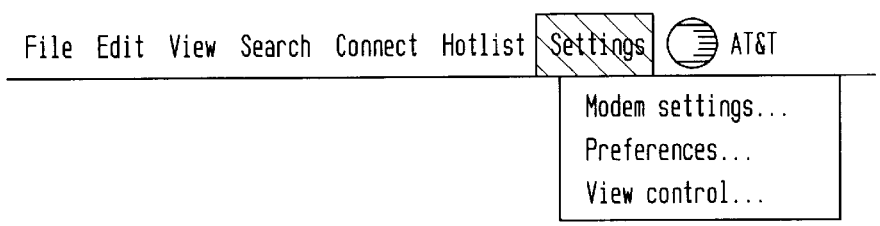
Figure 13:
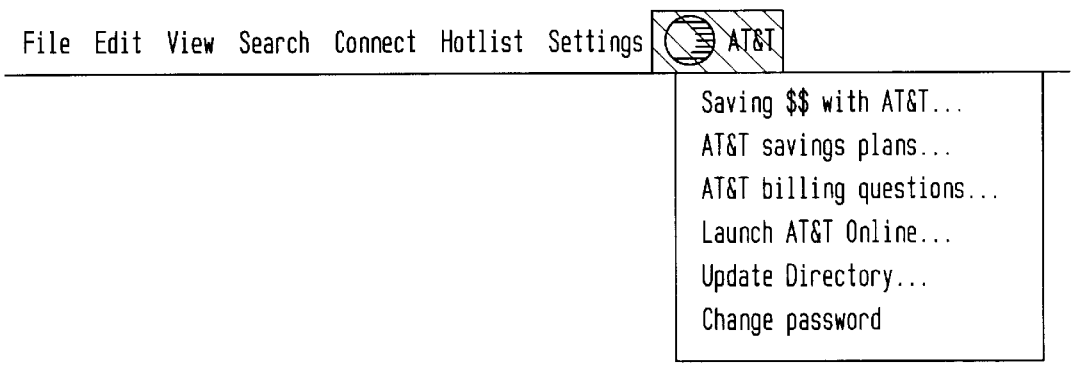

Finally FIGS. 11 through 13 illustrate "hot list", "settings", and "service provider" functions respectively. In response to these functions, a menu list appears that allows the user to create hotlists, to set system preferences and to obtain additional information from the service provider.

Thus, the present invention provides many advantages compared to traditional telephone directory systems. The system allows for a variety of connection means collected together that allow the user to access others via voice call, fax call, E-mail and home page.

Furthermore, because the connections are handled through database handler 32 and database server 20, there is no need for the users to remember a connection address, such as E-mail addresses, fax numbers, voice numbers and so forth.

Moreover, virtual locations are introduced into the map-based directory system at low cost to the service operator, while providing tangible economic benefits to both users of the directory service and advertisers.

Selection of destinations by the user, or the signification of "hits" by a database search, are represented by a highlighted icon. Icons may represent either connection destinations, or collection of destinations such as office buildings. Furthermore, icons may be dynamic or animated for advertising purposes. They may also produce sounds when selected. Moreover, icons corresponding to virtual locations are displayed in a different color than icons corresponding to real locations to eliminate user confusion.

In accordance with the present invention, icons are advantageously organized geographically, using a map viewing system, which shows both real and virtual locations as well as geographical features, such as rivers, parks and other features such as town boundaries. These map views may be panned or zoomed from national/international level, down to a local level.

As a result of a database directory search, based on names, addresses or keywords, listings can be found, and "hits" within a predetermined geographical region may be displayed by highlighted icons.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

What is claimed is:

1. A method for providing map-based directory services comprising the steps of:

generating for display on a display screen an image of a map of a real-world geographic region, wherein an icon representing a virtual location of an entity is depicted on said image; and establishing a connection between a first communication device located in proximity of said display screen and a second communication device located in proximity of said entity, in response to a request for communication with said entity.

2. The method in accordance with claim 1, wherein said image is generated remotely from said display screen and is transmitted to said display screen via a communications channel.

3. The method in accordance with claim 1, wherein said connection is a telephone connection and said first communication device and said second communication device are first and second telephone sets, respectively.

4. The method in accordance with claim 3, wherein said step of establishing a telephone connection further comprises the steps of:

initiating a first phone call to said first telephone set; and initiating a second phone call to said second telephone set; and bridging said first and second phone calls so as to establish said telephone connection between said first and second telephone sets.

5. The method in accordance with claim 4, wherein prior to said step of initiating a first phone call, the method comprises the steps of:

transmitting a first telephone number relating to said first telephone set to a switching network; and transmitting a second telephone number relating to said second telephone set to said switching network.

6. The method in accordance with claim 1, further comprising the step of generating for display on said display screen advertising information in response to selection of said icon by a user of said display screen.

7. The method in accordance with claim 6, wherein said step of establishing a connection is performed in response to a request from said display screen to transmit a facsimile message to said entity.

8. The method in accordance with claim 7, wherein said advertising information includes said facsimile message.

9. The method in accordance with claim 8, wherein said facsimile message comprises an order page.

10. The method in accordance with claim 1, wherein said entity is virtually located within building.

11. The method in accordance with claim 10, further comprising the step of displaying on said display screen a list of entities located in said building.

12. The method in accordance with claim 10, further comprising the said step of displaying on said display screen listing information relating to persons associated with each entity in said building.

13. The method of claim 1, wherein said icon representing said virtual location of said entity is depicted at a position on said image in accordance with latitude and longitude parameters associated with said virtual location.

14. A method for providing map-based directory services utilizing virtual locations comprising the step of:

generating for display on a display screen an image of a map of a real-world geographic region, wherein an icon representing a virtual location of a person or business establishment is depicted on said image.

15. The method in accordance with claim 14, wherein said image is generated remotely from said display screen and is transmitted to said display screen via a communications channel.

16. The method in accordance with claim 14, further comprising the steps of:

retrieving a first directory record, wherein said first directory record corresponds to said virtual location; and retrieving a second directory record, wherein said second directory record corresponds to a real location of said person or business establishment.

17. The method in accordance with claim 16, wherein said first directory record includes a pointer and said step of retrieving a second directory record includes the step of following said pointer to said second directory record.

18. The method in accordance with claim 16, wherein information in said second directory record is used as an identity for said virtual location.

19. The method in accordance with claim 14, wherein said icon is depicted on said image in a manner that distinguishes said icon from icons representing real locations.

20. The method of claim 14, wherein said icon representing said virtual location of said person or business establishment is depicted at a position on said image in accordance with latitude and longitude parameters associated with said virtual location.

21. A system for providing map-based directory services comprising:
 a memory device having stored therein information relating to a plurality of geographical maps and a plurality of directory records each relating to an entity; and
 a processor in communication with said memory device, said processor configured to (1) generate for display on a display screen an image of a map of a real-world geographic region, wherein an icon representing a virtual location of an entity is depicted on said image, and (2) initiate a connection between a first communication device located in proximity of said display screen and a second communication device located in proximity of said entity, in response to a request for communication with said entity.

22. The system of claim 21, wherein said memory device and said processor are separated from said display screen via a communications channel.

23. The system of claim 21, wherein said connection is a telephone connection and said first communication device and said second communication device are first and second telephone sets, respectively.

24. The system of claim 23, wherein said processor is further configured to initiate a first phone call to said first telephone set, initiate a second phone call to said second telephone set, and initiate a bridging of said first and second phone calls so as to establish said telephone connection between said first and second telephone sets.

25. The system of claim 24, wherein prior to initiating said first phone call, said processor transmits a first telephone number relating to said first telephone set to a switching network and a second telephone number relating to said second telephone set to said switching network.

26. The system of claim 21, wherein said icon is selectable by a user of said display screen.

27. The system of claim 26, wherein said memory device further has embodied therein advertising messages corresponding to said directory records and said processor is configured to display on said display screen information relating to an advertising message in response to selection of said icon by said user.

28. The system of claim 21, wherein said entity is virtually located within a building.

29. The system of claim 28, wherein said processor is further configured to display on said display screen a list of entities located in said building.

30. The system of claim 28, further wherein said processor is further configured to display on said display screen listing information relating to persons associated with each entity in said building.

31. A system for providing map-based directory services utilizing virtual locations comprising:
 a memory device storing information relating to a plurality of geographical maps and a plurality of directory records each relating to an entity; and
 a processor in communication with said memory device, said processor configured to generate for display on a display screen an image of a map of a real-world geographic region, wherein an icon representing a virtual location of a person or business establishment is depicted on said image.

32. The system of claim 31, wherein said memory device and said processor are separated from said display screen via a communications channel.

33. The system of claim 31, wherein said processor is further configured to retrieve a first directory record, wherein said first directory record corresponds to said virtual location and, a second directory record, wherein said second directory record corresponds to a real location of said person or business establishment.

34. The system of claim 33, wherein said first directory record includes a pointer and said processor follows said pointer to said second directory record.

35. The system of claim 34, wherein information in said second directory record is used as an identity for said virtual location.

36. The system of claim 35, wherein said icon is depicted on said image in a manner that distinguishes said icon from icons representing real locations.

37. An article of manufacture, comprising:
 a computer readable medium having computer readable program code stored therein, said computer readable code comprising means for causing a computer system to (1) generate for display on a display screen an image of a map of a real-world geographic region, wherein an icon representing a virtual location of an entity is depicted on said image, and (2) initiate a connection between a first communication device located in proximity of said display screen and a second communication device located in proximity of said entity, in response to a request for communication with said entity.

38. An article of manufacture, comprising:
 a computer readable medium having computer readable program code stored therein, said computer readable code comprising means for causing a computer system to generate for display on a display screen an image of a map of a real-world geographic region, wherein an icon representing a virtual location of a person or business establishment is depicted on said image.

39. A method for providing map-based directory services comprising the steps of:
 generating for display on a display screen an image of a geographic region, wherein an icon representing a location of an entity is depicted on said image;
 generating for display on said display screen advertising information in response to selection of said icon by a user of said display screen, wherein said advertising information includes a facsimile message; and
 establishing a connection between a first communication device located in proximity of said display screen and a second communication device located in proximity of said entity, in response to a request from said display screen to transmit said facsimile message to said entity.

40. The method of claim 39, wherein said facsimile message comprises an order page.

41. A method for providing map-based directory services comprising the steps of:
 generating for display on a display screen an image of a geographic region, wherein an icon representing a location of an entity is depicted on said image;
 generating for display on said display screen advertising information in response to selection of said icon by a user of said display screen;
 after displaying said advertising information, receiving a request for communication with said entity; and
 establishing a connection between a first communication device located in proximity of said display screen and a second communication device located in proximity of said entity, in response to said request for communication with said entity.

* * * * *